(12) United States Patent
Machulkin et al.

(10) Patent No.: US 12,454,527 B2
(45) Date of Patent: Oct. 28, 2025

(54) CONJUGATE MONOMETHYL AURISTATIN E TO OBTAIN A COMPOSITION FOR TREATMENT OF PROSTATE CANCER

(71) Applicant: IZVARINO FARMA AB, Malmö (SE)

(72) Inventors: Aleksei Ehduardovich Machulkin, Kamensk-Uralskii (RU); Anastasiia Alekseevna Uspenskaia, Kamensk-Uralskii (RU); Elena Sergeevna Khazanova, Moscow (RU); Aleksei Alekseevich Rybalov, Nevinnomyssk (RU); Svetozar Olegovich Pchelintsev, Konakovo (RU); Stanislav Aleksandrovich Petrov, Krasnodarskii krai (RU); Anton Petrovich Ber, Ust-Vymskii r-n (RU); Nikolai Petrovich Zyk, Moscow (RU); Ian Andreevich Ivanenkov, Moscow (RU); Dmitrii Aleksandrovich Skvortsov, Moscow (RU); Aleksandr Sergeevich Erofeev, Moscow (RU); Petr Vladimirovich Gorelkin, Moscow (RU); Elena Kimovna Beloglazkina, Moscow (RU); Aleksandr Georgievich Mazhuga, Moscow (RU)

(73) Assignee: IZVARINO FARMA AB, Malmö (SE)

( * ) Notice: Subject to any disclaimer, the term of this patent is extended or adjusted under 35 U.S.C. 154(b) by 718 days.

(21) Appl. No.: 17/749,958

(22) Filed: May 20, 2022

(65) Prior Publication Data
US 2022/0281852 A1 Sep. 8, 2022

Related U.S. Application Data

(63) Continuation of application No. PCT/RU2020/000473, filed on Sep. 8, 2020.

(30) Foreign Application Priority Data

Nov. 22, 2019 (RU) ................................ 2019137590

(51) Int. Cl.
C07D 403/12 (2006.01)
A61K 47/10 (2017.01)
A61K 47/32 (2006.01)

(52) U.S. Cl.
CPC ............ *C07D 403/12* (2013.01); *A61K 47/10* (2013.01); *A61K 47/32* (2013.01)

(58) Field of Classification Search
CPC .... C07D 403/12; C07D 207/09; A61K 47/10; A61K 47/32; A61K 47/542; A61K 47/55;
(Continued)

(56) References Cited

U.S. PATENT DOCUMENTS

| 5,665,384 A | 9/1997 | Courteille et al. |
| 11,202,836 B2 | 12/2021 | Basilion et al. |
| 2021/0162057 A1 | 6/2021 | Peck et al. |

FOREIGN PATENT DOCUMENTS

| RU | 2713151 | 7/2019 |
| RU | 2697519 | 8/2019 |

(Continued)

OTHER PUBLICATIONS

Senter, P., Sievers, E. The discovery and development of brentuximab vedotin for use in relapsed Hodgkin lymphoma and systemic anaplastic large cell lymphoma. Nat Biotechnol 30, 631-637 (2012). (Year: 2012).*

(Continued)

*Primary Examiner* — Clinton A Brooks
*Assistant Examiner* — Izabela Schmidt
(74) *Attorney, Agent, or Firm* — Oblon, McClelland, Maier & Neustadt, L.L.P.

(57) ABSTRACT

Provided is a conjugate of the formula (I) for treatment of tumors expressing PSMA, which comprises a PSMA-ligand (Continued)

with a linker and an antineoplastic agent monomethyl aluistatin E (MMAE). A composition for lyophilizate preparation based on the conjugate, a dosage form for therapy and obtained by the lyophilization of the composition, PSMA expressing a prostate tumor growth inhibition, a solution for infusions or injections containing the dosage form, reconstituted by a solvent, comprising 95% ethyl alcohol and polysorbate 80 at a mass ratio (30-60 wt %):(70-40 wt %), respectively, also provided. It is possible to obtain high affinity and selectivity of the action of the conjugates in relation to PSMA expressing cells using the conjugate of the formula (I).

20 Claims, 16 Drawing Sheets

(58) Field of Classification Search
CPC ............... A61K 31/40; C07K 5/06052; C07K 5/06078; A61P 35/00
See application file for complete search history.

(56) References Cited

FOREIGN PATENT DOCUMENTS

| | | | |
|---|---|---|---|
| RU | 2697519 C1 * | 8/2019 | |
| SU | 1676572 | 9/1991 | |
| WO | WO 2005/081711 | 9/2005 | |
| WO | WO-2005081711 A2 * | 9/2005 | ............. A61K 38/08 |

OTHER PUBLICATIONS

Pal; et.al., Molecular Pharmaceutics 2019 16 (7), 3237-3252. (Year: 2019).*

Cunningham D, Parajuli KR, Zhang C, Wang G, Mei J, Zhang Q, Liu S, You Z. Monomethyl Auristatin E Phosphate Inhibits Human Prostate Cancer Growth. Prostate. Nov. 2016;76(15):1420-30. (Year: 2016).*

Lütje S et al., J Nucl Med. Mar. 2018;59(3):494-501. (Year: 2018).*

RU-2697519-C1—machine translation (printed May 18, 2025). (Year: 2015).*

Wang et al., "A low molecular weight multifunctional theranostic molecule for the treatment of prostate cancer", Feb. 21, 2022, 2335-2350.

Wang et al., "Small Molecule-Based Prodrug Targeting Prostate Specific Membrane Antigen for the Treatment of Prostate Cancer", Jan. 22, 2021, 417.

Machkulin et al., "Synthesis, Characterization, and Preclinical Evaluation of a Small-Molecule Prostate-Specific Membrane Antigen-Targeted Monomethyl Auristatin E Conjugate", Nov. 19, 2021, Abstract.

Murelli et al, "Chemical Control over Immune Recognition: A Class of Antibody-Recruiting Small Molecules That Target Prostate Cancer", *J. Am. Chem. Soc.* 2009, vol. 131, No. 47, pp. 17090-17092.

Tykvart et al, "Rational design of urea-based glutamate carboxypeptidase II (GCPII) inhibitors as versatile tools for specific drug targeting and delivery", *Bioorganic & Medicinal Chemistry* (2014) 43 pages.

Liang et al, "The copper(1)-catalyzed alkyne-azide cycloaddition (CuAAC) "click" reaction and its applications. An overview", Coordination Chemistry Reviews, (2011) vol. 255, pp. 2933-2945.

International Search Report issued Jan. 21, 2021, in International Application No. PCT/RU 2020/000473—3 pages.

Written Opinion of the International Searching Authority issued Jan. 21, 2021, in International Application No. PCT/RU 2020/000473—5 pages.

Pantub et al, "Preparation of Salicylic Acid Loaded Nanostructured Lipid Carriers Using Box-Behnken Design: Optimization, Characterization and Physicochemical Stability", *Journal of Oleo Science*, 2017, vol. 66(12), pp. 1311-1319.

Search report and written opinion issued May 20, 2020, in Russian patent application No. 2019137590—6 pages.

* cited by examiner

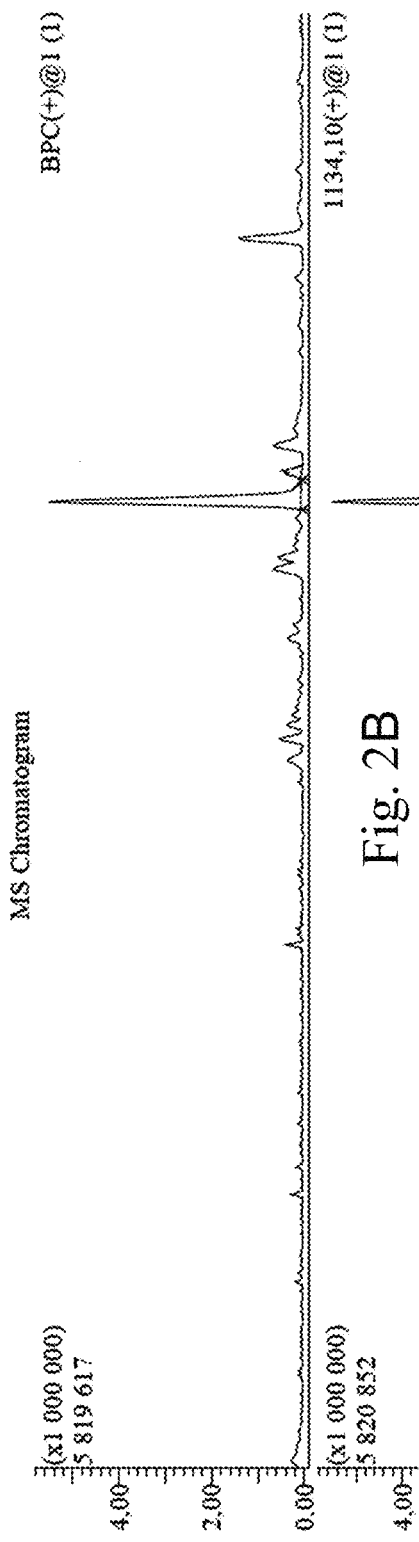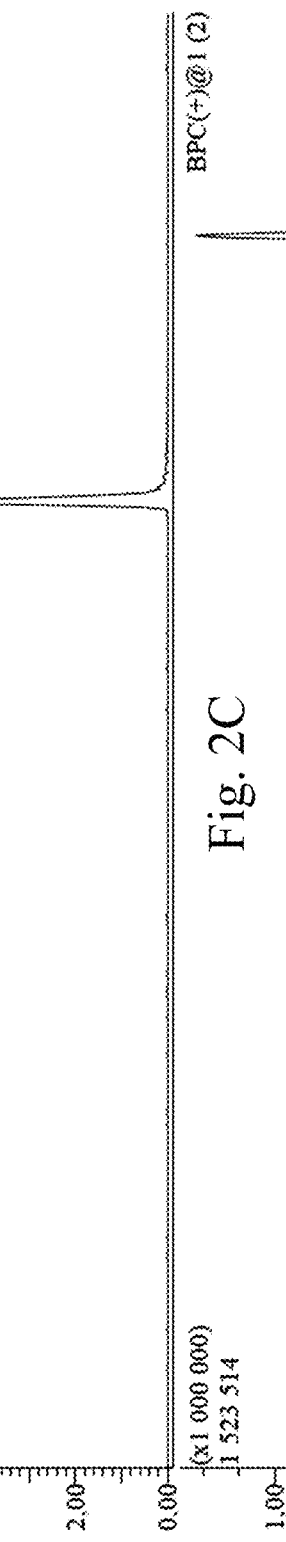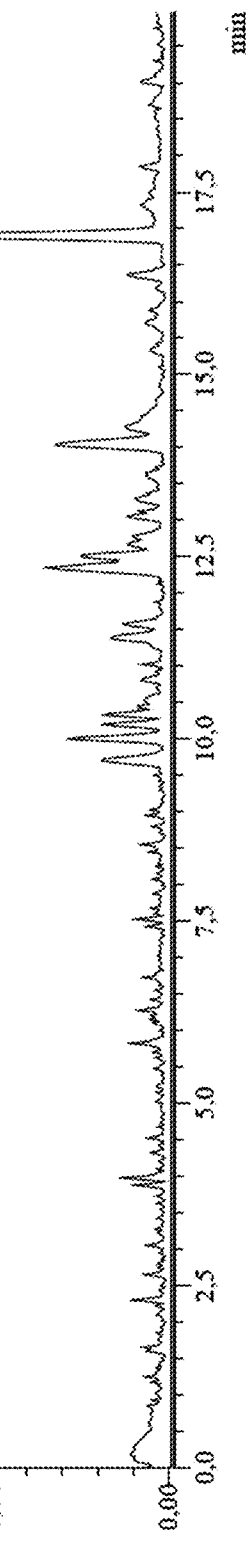
Fig. 2A
Fig. 2B
Fig. 2C

CONJUGATE MONOMETHYL AURISTATIN E TO OBTAIN A COMPOSITION FOR TREATMENT OF PROSTATE CANCER

CROSS-REFERENCE TO RELATED APPLICATION

This application is a bypass continuation of PCT/RU2020/000473, filed Sep. 8, 2020 which claims priority to Russian Federation 2019137590, filed Nov. 22, 2019, the content of both applications are incorporated herein by reference in their entireties.

BACKGROUND OF THE INVENTION

FIELD OF THE INVENTION

The invention relates to the field of organic and medical chemistry, oncology and relates to a new class of compounds for treating tumors expressing PSMA, including prostate tumors.

DESCRIPTION OF THE RELATED ART

Cancer is a disease resulting front uncontrolled cell growth in different tissues. In majority of cases new cells invade a current tissue (invasive growth) or give metastases into distant organs. Cancer arises in different tissues and organs, and the disease goes non-specifically. Thus, the designation "cancer" as a family name involves a big group of certain diseases of different organs, tissues and types of cells.

Early-stage tumors are to be removed by surgical interventions and chemotherapeutic agents. Metastatic tumors are usually treated by palliative care using chemotherapeutic agents. In this case the purpose is to improve quality of life and prolong survival:

The majority of chemotherapeutic agents, currently administered by parenteral injections, do not often provide an aiming, effect at tumor tissue target or in tumor cells, and due to systemic administration it is distributed non-specifically in the organism, entering respectively in the sites Showing adverse dine exposure, for example, healthy cells, tissues and organs. It can result in adverse side effects and even severe effects of general toxicity what highly limits therapeutically applicable dose ranges of drugs or could be a reason for complete treatment termination, Therefore, during several years improved and selective delivery of these chemotherapeutic agents in the tumor or tissues, located in direct proximity to it, and respective increased effect, on the one hand, and minimization of toxic side effects, on the other hand, are the central concern for development of novel chemotherapeutic agents. To date, many attempts to develop an effective was of active compound injection into the target cell were already been undertaken. The optimization of active compound binding the intracellular target and minimization of intracellular active compound distribution, for example, in adjacent cells, is still a challenging concern.

For example, monoclonal antibodies are suitable for a target exposure for tumor tissues or tumor cells. In recent years, the importance of such antibodies for a clinical treatment of cancer has significantly increased due to activity of such agents as trastuzumab (Herceptin), rituximab (Rituxan), cetuximab (Erbitux) and bevacizumab (Avastin) approved for treatment of certain specific oncologic diseases [see, for example, G. P. Adams and L. M. Weiner, Nat. Biotechnol. 23, 1147-1157 (2005)]. Thus, there is a significantly increased interest for so-called immunoconjugates such as, for example, mentioned above binding, compound conjugates—active compound (ADC) where internalizing antibody to tumor-associated antigen is covalently bound with cytotoxic agent by a binding fragment ("linker"). After administration into the tumor cell and subsequent conjugate degradation, either cytotoxic agent or another metabolite, formed from a cytotoxic agent and having a cytotoxic activity, is released inside the tumor cell providing a direct and selective activity. It allows to retain a normal tissue impairment much more narrowly compared with a standard chemotherapy of cancer [see, for example, J. M. Lambert, Curr. Opin. Pharma-col. 5, 543-549 (2005); A. M. Wu and P. D. Senter, Nat. Biotechnol. 23, 1137-1146 (2005); P. D. Senter, Curr. Opin. Chem. Biol. 13, 235-244 (2009); L. Ducry and B. Stump, Bioconjugate Cner Ϋ.21, 5-13 (2010)].

Instead of antibodies it is also possible to use target compounds from low-molecular weight drugs which specifically bind to a target, located in the certain region, for example, to a receptor [see, for example, E. Ruoslahti et al., Science 279: 377-380 (1998); D. Karkan et al. PLoS ONE 3 (6), e2469 (Jun. 25, 2008)]. Conjugates of cytotoxic active compounds and targeting ligands, which have a definite characteristics and splitting point between ligand and drug product for active compound release, are also known. "A prior specific splitting point"of this type is able to exist, for example, in the peptide which can be selectively split in a specific site by an enzyme in the place of active compound effect (see, for example, R. A. Firestone and L. A. Telan, USA patent application 2002/0147138].

Auristatin E (AE) and Monomethyl auristatin E (MMAE) are synthetic analogues of dolastatin, specific group of psoudopeptides which were initially isolated from marine sources and in some cases have so high cytotoxic activity regarding tumor cells [you can find a review, for example, in G. R. Pettit, Prog. Chem. Org. Nat. Prod. 70, 1-79 (1997); G. R. Pettit et al., Anti-Cancer Drug Design 10, 529-544(1995); G. R. Pettit et al., Anti-Cancer Drug Design 13, 243-277 (1998)].

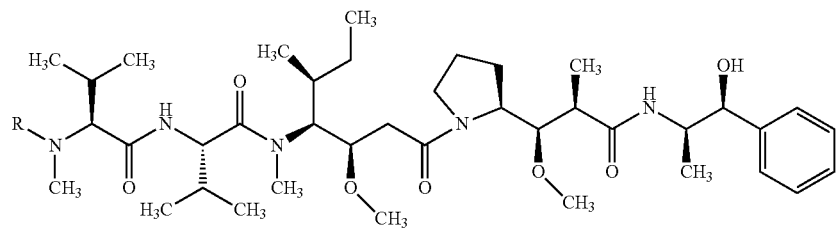

Auristatin E (AE): R=CH₃
Monomethyl auristatin E (MMAE) R=H

However, MMAE has a disadvantage aimed at relatively high systemic toxicity. To improve selectivity regarding a tumor, MMAE is used in combination with enzymatic splitting valine-citrulline linkers in compound binding conjugate—active compound for more targeting oncologic therapy [WO 2005/081711-A2; S. O. Doronina et al., Bio-conjugate Chem. 17, 114-124 (2006)]. After proteolytic degradation MMAE is released from a relevant compound binding conjugate—active compound inside the cell.

However, using as an antibody-active agent conjugates (ADC), MMAE is incompatible with binding fragments (linkers) between an antibody and drug product which don't contain an enzymatic splitting point [S. O. Doronina et al., Bio-conjugate Chem. 17, 114-124 (2006)].

As an example of ligand-drug product conjugate, Adcetris (brentuximab vedotin), where auristatin E is conjugated with anti-CD30 antibody, recently approved as a therapeutic product for Hodgkin lymphoma and anaplastic large cell lymphoma, can be provided. This product turned out to be effective for treatment of Hodgkin lymphoma and anaplastic large cell lymphoma. Also, as an example of ligand-drug product conjugate, Polatuzumab vedotin—anti-CD79b antibody and drug product conjugate (ADC) can be presented, Protein CD79b is highly specific and expressing in majority B-cell non-Hodgkin lymphomas (NHL), thus it is a promising target for developing novel products [Emma D. D. Polatuzumab Vedotin: First Global Approval Drugs (2019) 79:1467-1475]. Polatuzumab vedotin binds to CD79b imitating the therapeutic product internalization (monomethyl auristatin E (MMAE)) into the B-cell. However, these conjugates are not applicable for treatment of prostate tumors due to the lack of specific affinity to prostate cells and tissues.

Prostate cancer (PC) is the most common type of cancer in men in developed countries and the third most frequent cancer in the world. PC mortality is 7.1 per 100 thousands of population and increased by 42% for past 12 years. Besides, PC is one of leading causes of cancer death in men, both in Russia and all over the world.

In accordance with a high demand for development of products with high efficacy and low toxicity, targeted therapy is high-priority direction. The decision disadvantage using an antibody as a ligand is low weight conjugate load with an active substance, decreased Stability of high-molecular weight antibody and whole conjugate and high cost for bioproducts. Therefore, the aim of this development is to obtain MMAE with low-molecular weight ligand with high affinity to prostate cells conjugate, suitable for targeting delivery and therapy of prostate tumors.

BRIEF SUMMARY OF THE INVENTION

Technical problem which is intended to be resolved by the invention is the development of novel therapeutic compounds far treatment of prostate tumors expressing PSMA, including PSMA-ligand with linker, described in RU2697519, and antineoplastic product manomethyl auristatin E (MMAE), method for its obtaining and using.

The description of a PSMA-ligand with a linker is provided in RU2697519 where this compound has a number of 70. This description should be considered completely included in the invention description. The structure of compound (70) is given below:

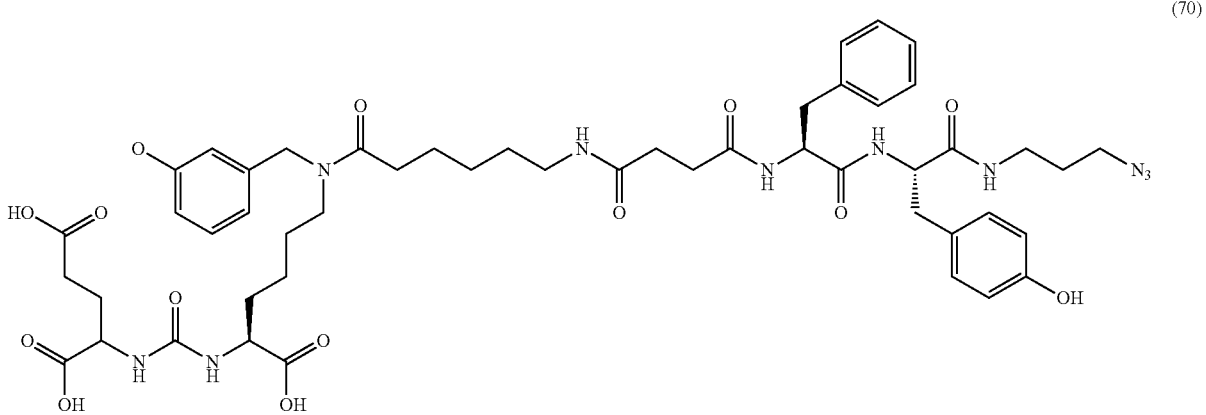 [SMILES: [N-]=[N+]=NCCCNC(=O)[C@H](Cc1ccc(O)cc1)NC(=O)[C@H](Cc1ccccc1)NC(=O)CCC(=O)NCCCCCC(=O)N(CCCC[C@H](NC(=O)NC(CCC(=O)O)C(=O)O)C(=O)O)Cc1cccc(O)c1]

(70)

The technical result of the claimed group of inventions is the high affinity and selectivity of the action of the claimed conjugates in relation to PSMA expressing cells. These conjugates let you expand the arsenal of therapeutic tools for therapy of prostate tumors with, high PSMA expression, allowing for selective binding to cancer cells and achieving a high exposure efficacy for a tumor. The results of our studies showed that an effective tumor growth inhibition (TGI) using the claimed conjugate is achieved using a dose of approximately 0.3 mg/kg. This dose is comparable with MMAE doses, used for commercial products, described above.

The use of an azido derivative of aminopentanoic acid in the synthesis of the inventive conjugates makes it possible to obtain a PSMA vector with a long hydrophobic linker and protected carboxy groups, which in turn facilitates its modification and reduces the amount of solvents used in the solvent process due to a significantly increased solubility of the parent compound (PSMA vector with a long hydrophobic linker and protected carboxy groups).

The key feature of the claimed conjugate is the presence of a long hydrophobic linker in the structure, as well as additional aromatic fragments, the presence of which contributes to better binding of the claimed conjugate to the protein target, due to the involvement of additional interactions between the conjugate and the hydrophobic pockets in the structure of the hydrophobic tunnel of the protein target.

The technical problem is solved by a compound for treatment of prostate tumors expressing PSMA, which is a covalently linked PSMA-binding ligand based on a urea derivative of the DCL structure and a modified hydrophobic peptide linker, including 6-aminohexanoic acid fragment, associated with MMAE antineoplastic agent of formula (I):

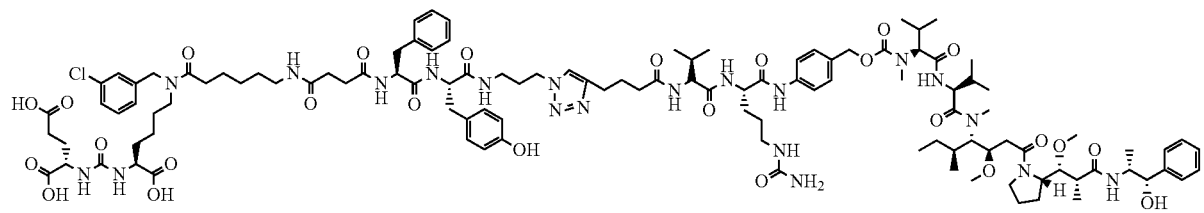

(I)

The problem is also solved by a method for obtaining a compound for therapy of prostate tumors expressing PSMA Conjugate (I), including the synthesis of a tritret-butyl derivative of PSMA-binding ligand of formula (III):

followed by the preparation of a compound containing an alkylated 3-tert-butyl derivative of the PSMA frond and a linker fragment representing an alkyl fragment containing 5 carbon atoms of the formula (V):

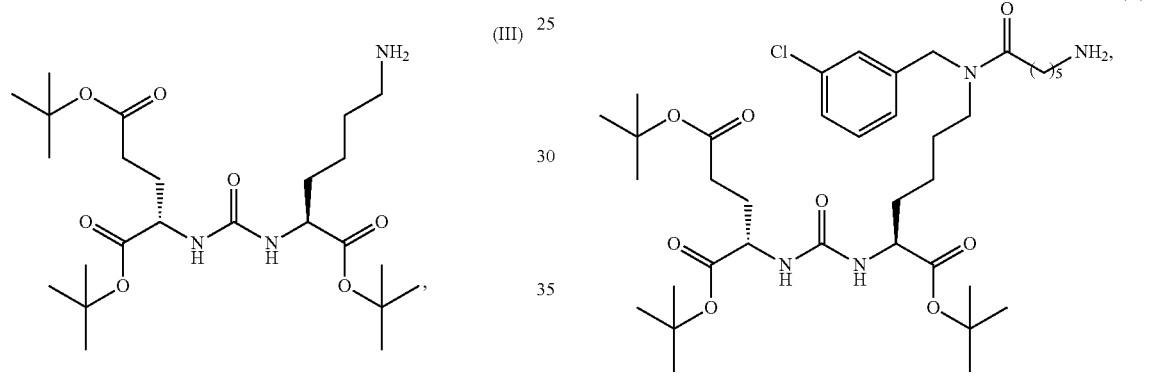

(III)

(V)

followed by alkylation of the obtained 3-tert-butyl derivative of PSMA-binding ligand to achieve the compound of formula (IV):

which is modified with succinic anhydride, to obtain an acylated derivative, then the dipeptides of aromatic amino acid derivatives, winch are L-phenylalanyl-L-tyrosine of formula (VI), are obtained to bind to a modified linker fragment,

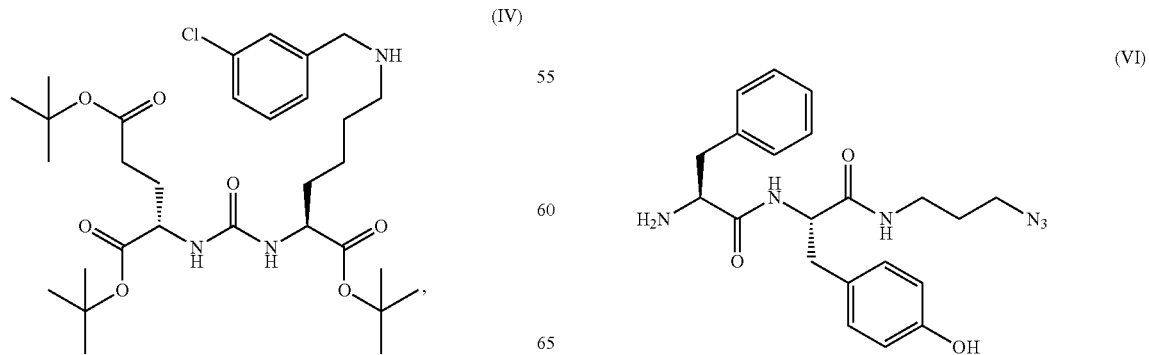

(IV)

(VI)

then reach 3-tert-butyl derivative of the conjugate of the radical PSMA-binding ligand and a modified hydrophobic peptide linker, including fragments of 6-aminohexanoic acid, a fragment of L-phenylalanine, a fragment of L-tyrosine of the formula (VII):

(VII)

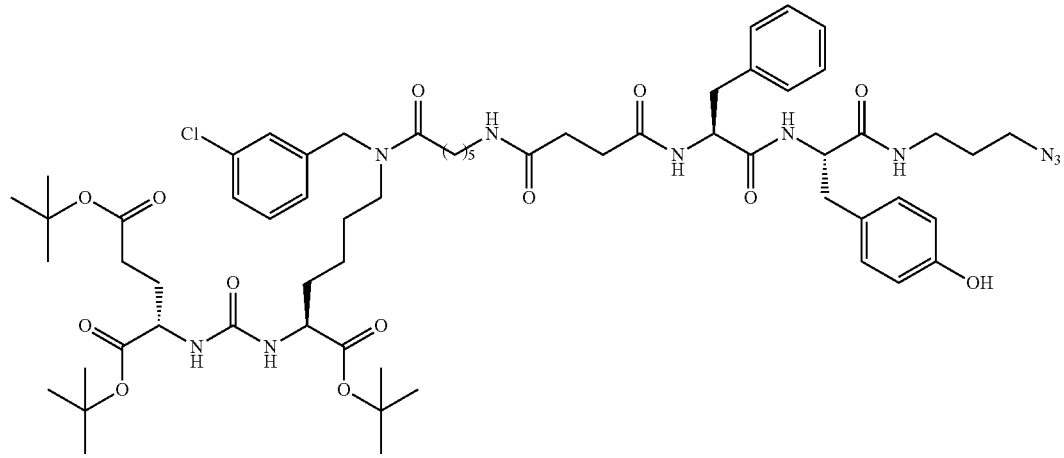

with the subsequent removal of the tert-butyl protective groups of the compound of formula (VII) to obtain a covalently bonded PSMA-binding ligand and a modified hydrophobic peptide linker (II):

(II)

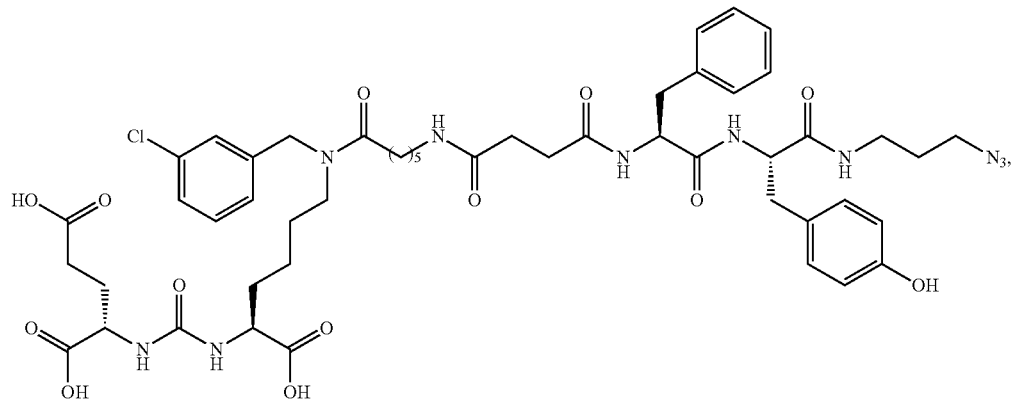

obtaining a modified MMAE (X) is implemented through proteolytically splitting dipeptide linker based on valine-citrulline containing p-aminobenzyl alcohol (Val-Cit-PAB) wherein an acylation reaction of a peptide Val-Cit-PAB derivative using 5-hexenoic acid is carried out at the first stage:

(VIII)

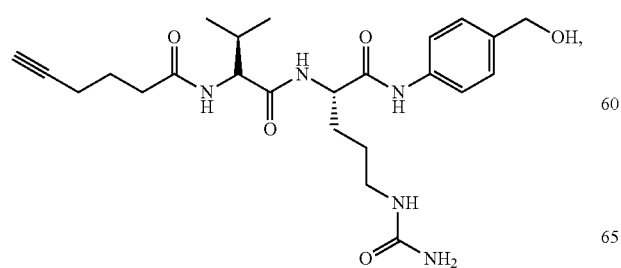

then a hydroxyl group of p-aminobenzyl fragment using bis-(4-nitrophenyl) carbonate is modified:

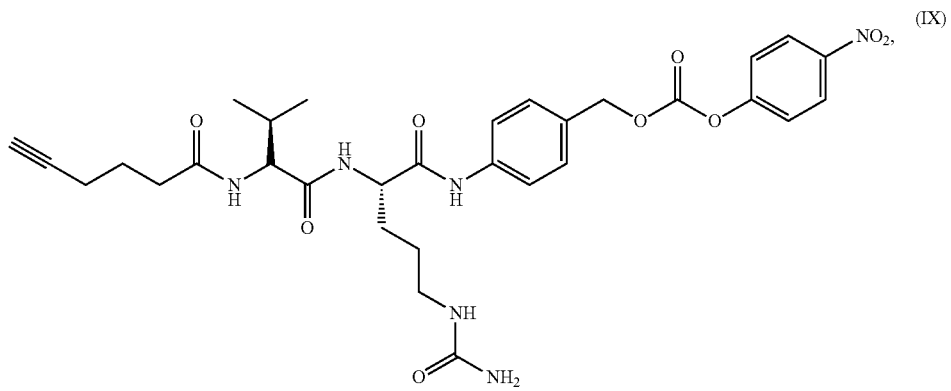

followed by interaction of the obtained compound (IX) between monomethyl auristatin E:

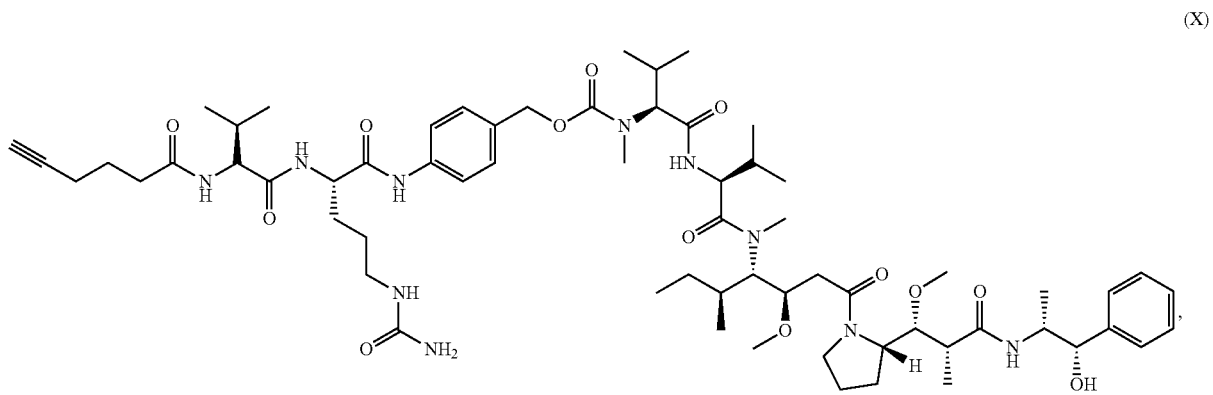

next, the copper (I) catalyzed azide-alkyne cycloaddition of compound (II) is reacted with a modified monomethyl auristatin E derivative containing a terminal triple bond, which results in obtaining, the target compound (I) (L. Liang, Astruc The copper(I)-catalyzed alkyne-azide cycloaddition (CuAAC) "click" reaction and its applications. See overview Coordination Chemistry Reviews, 255 (2011) 2933-2945) which is incorporated by reference.

In this case, the alkylated 3-tert-butyl derivative of the PSMA ligand is obtained by reductive amination with m-chlorobenzaldehyde; the compound of formula (V) is obtained by acylation of the 6-azidohexanoic acid derivatives to obtain the azide derivative of the alkylated derivative of the PSMA ligand, followed by reduction of the azide to an amino group. The reduction reaction of the azido to the amino group is carried out either in the presence of triphenylphosphine and water in THF solution, or in methanol solution using hydrogen in the presence of palladium on carbon as a catalyst. The linker fragment modification representing an alkyl fragment containing 5 carbon atoms is implemented by the acylation reaction of the amino group with succinic anhydride in the presence of non-nucleophilic bases using diisopropylethylamine or triethylamine. The preparation of 3-tert-butyl derivative of the conjugate of formula (VII) is carried out by acylation of a compound derivative (V), acylated with succinic anhydride, of a dipeptide of formula (VI), and the removal of 3-tert-butyl protective groups is performed in the presence of 9-11% TFA for 15-17 hours using dichloromethane.

A modified Val-Cit-PAB (VIII) derivative is obtained using 5-hexenoic acid acylation. The further modification is carried out using bis(4-nitrophenyl) carbonate, followed by MMAE reaction.

The reaction of copper (I) catalyzed azide-alkyne cycloaddition of compound (II) with a fluorescent dye containing a terminal triple bond is carried out, which results in the target compound (I) (L. Liang, D. Astruc The copper(I)-catalyzed alkyne-azide cycloaddition (CuAAC) "click" reaction and its applications. An overview Coordination Chemistry Reviews, 255 (2011) 2933-2945).

This problem is also solved by a composition for therapy of prostate tumors expressing PSMA, comprising a conjugate of formula (I) and a pharmaceutically acceptable carrier, vehicle or diluent.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 2A-2D show HPLC-chromatogram of Conjugate (I) compound, peak 1: retention time 11.2, content (%); 0.350; peak 2; retention time 12.6, content (4); 0.359; peak 3; retention time 13.2, content (%); 96.3; peak 4; retention time 13.5, content (%): 0.953; peak 5; retention time 13.9, content (%); 1.130; peak 6: retention time 14.8, content (%): 0.361.

FIGS. 1-15 as described in parent application PCT/RU2020/000473 are specifically incorporated by reference for all purposes.

DETAILED DESCRIPTION OF THE INVENTION

All publications, patent applications, patents, and other references mentioned herein are incorporated by reference in their entirety. Further, the materials, methods, and examples are illustrative only and are not intended to be limiting, unless otherwise specified.

The following are definitions of terms used in the description of the present invention. "PSMA" is a prostatic specific membrane antigen transmembrane glycoprotein II with a mass of ~100 kDa, consisting of 750 amino acids. This protein consists of a short intracellular region (1-18 amino acids), a transmembrane domain (19-43 amino acids) and a large extracellular domain (44-750 amino acids). This protein has a high expression in the prostate tissues, therefore it is a promising target for targeted delivery.

EDC.HCl—1-Ethyl-3-(3-dimethylaminopropyl) carbodiimide hydrochloride
PFPOH—pentafluorophenol
HOBT—hydroxybenzotriazole
HBTU—3-[Bis(dimethylamino)methyliumyl]-3H-benzotriazole-1-oxide hexafluorophosphate
EtOAc/MeOH—ethyl acetate/methanol
DMAP—4-dimethylaminopyridine
DCM—dichloromethane
DIC—diisopropylcarbodiimide
DMF—dimethylformamide
DIPEA—diisopropylethylamine
TFA—trifluoroacetic acid
DHM—dichloromethane
PBS—sodium phosphate buffer
FBS—fetal bovine serum
$PPh_3$—Triphenylphosphine
PyBOP—benzotriazol-1-yl-oxytripyrrolidinophosphonium hexafluorophosphate
THF—tetrahydrofuran
$BOC_2O$—2-tertbutyl dicarbonate
TGC—tumor growth control
MMAE—monomethyl auristatin E
ITG—index of tumor growth
TGI—tumor growth inhibition
i/p—intraperitoneally
Vcp—mean volume All reagents used are commercially available; solvent evaporation as performed using a rotary evaporator, under reduced pressure at a bath temperature not more than 50° C.; monitoring, the progress of the reaction was carried out using thin-layer chromatography (TLC), and the reaction time was given for illustration only; the structure and purity of all isolated compounds was confirmed by at least one of the following methods: TLC (plates for TLC with pre-applied silica gel 60 $F_{254}$ Merck), Mass spectrometry or nuclear magnetic resonance (NMR). The product yield is for illustrative purposes only. Flash column chromatography was performed using Merck silica gel 60 (230-400 mesh ASTM). High-resolution mass spectra (HRMS) of positive ions were recorded on Jeol GCMate II spectrometer with an ionization energy of 70 eV, NMR spectra were recorded on Brinser Avance-400 instruments (operating frequency 400.1 and 100.6 MHz for $^1H$ and $^{13}C$, respectively) and Agilent 400-MR (operating frequency 400.0 and 100.6 MHz for $^1H$ and $^{13}C$, respectively) using deuterated chloroform (99.8% D) or DMSO (99.9% D) as a solvent, unless otherwise indicated, relative to tetramethylsilane (TMS) as an internal standard, parts per million (ppm); the usual abbreviations used are: s—singlet d—doublet, t—triplet q—quartet, m—multiplet, w—wide and so on.

Initially, 3-tert-butyl derivative of PSMA-binding ligand is obtained:

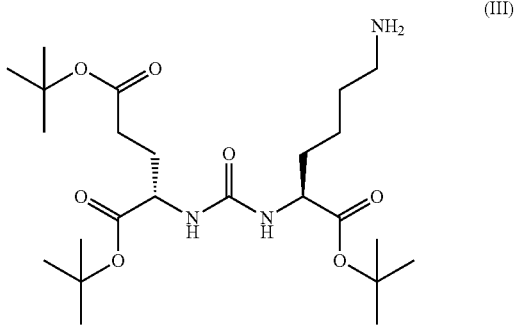 [SMILES: CC(C)(C)OC(=O)CC[C@H](NC(=O)N[C@@H](CCCCN)C(=O)OC(C)(C)C)C(=O)OC(C)(C)C]

Figure 9:
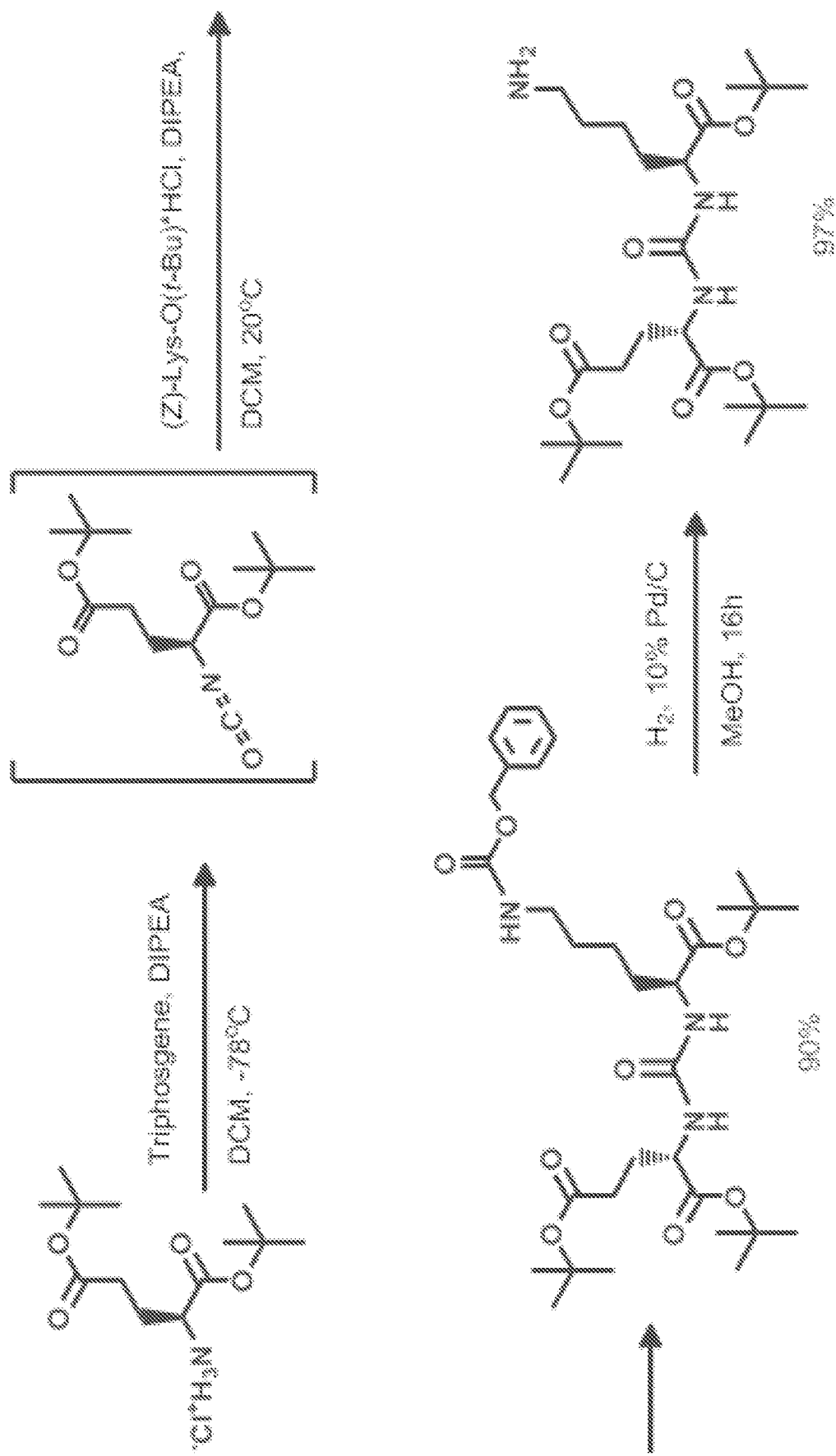
FIG. 9 describes a method for obtaining a compound of formula (III).

The compound of formula (III) can be obtained by a method known in the technology (Ryan P. Murelli, Andrew X. Zhang, Julien Michel, William L. Jorgensen, David A. Spiege. Chemical Control Over Immune Recognition: A Class of Antibody-Recruiting Molecules (ARMs) that Target Prostate Cancer. J. AM. CHEM. SOC. 2009, 131, 17090-17092) (FIG. 9), Then, the obtained 3-tert-butyl derivative cite PSMA-binding ligand is alkylated to get the compound of formula (IV). The alkylation reaction is carried out by reductive amination with m-chlorobenzaldehyde (Jan Tykvart, Jiří Schimer, Jitka Bařinková, Petr Pachl, Lenka Poštová-Slavětinská, Pavel Majer, Jan Konvalinka, Pavel Šácha. Rational design of urea-based glutamate carboxypeptidase II (GCPII) inhibitors as versatile tools for specific drug targeting and delivery. Bioorg Med Chem. 2014, 22(15): 4099-108.)

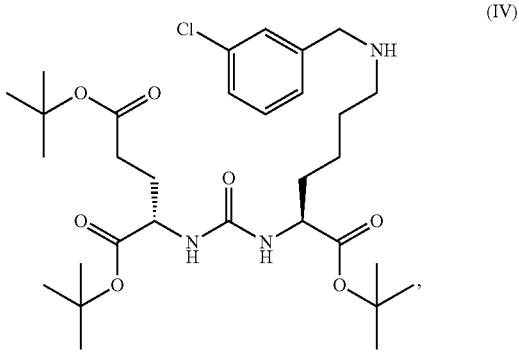 [SMILES: CC(C)(C)OC(=O)CC[C@H](NC(=O)N[C@@H](CCCCNCc1cccc(Cl)c1)C(=O)OC(C)(C)C)C(=O)OC(C)(C)C]

(IV)

The compound preparation of formula (V) is carried out by acylation of 5-azidohexanoic acid derivatives to obtain an azide derivative of an alkylated derivative of PSMA-ligand (V) followed by the azide reduction to the amino group, while the wide reduction to the amino group is carried. out in the presence of triphenylphosphine and water in a THF solution or in methanol solution using hydrogen in the presence of palladium on carbon as a catalyst. The acylation reaction is carried out in a polar aprotic solvent medium dissolving: the starting amine (IV), azido acid and non-nucleophilic base, taken from the calculation that at least 1 molar equivalent of amine is taken at least 1 molar equivalent of azido acid and base, as well as at least 100 molar equivalent of polar aprotic solvent; at least 1 molar equivalent of PyBOP is added to the mixture while stirring; the mixture is stirred at room temperature until the starting amine (IV) disappears.

The solvent is then removed from the Obtained reaction mixture under reduced pressure, and the target intermediate is isolated using column chromatography (Puriflach SILICA-HP 120G, 50 µm, gradient from 100% petroleum ether to 100% EtOAc. for 30 minutes, flow rate=50 mL/min). The upper limit of the reagents used is not limited, since an excess of any reagent does not reduce the reaction yields, but with a large excess, additional purification of the reaction products may be necessary.

Figure 10:
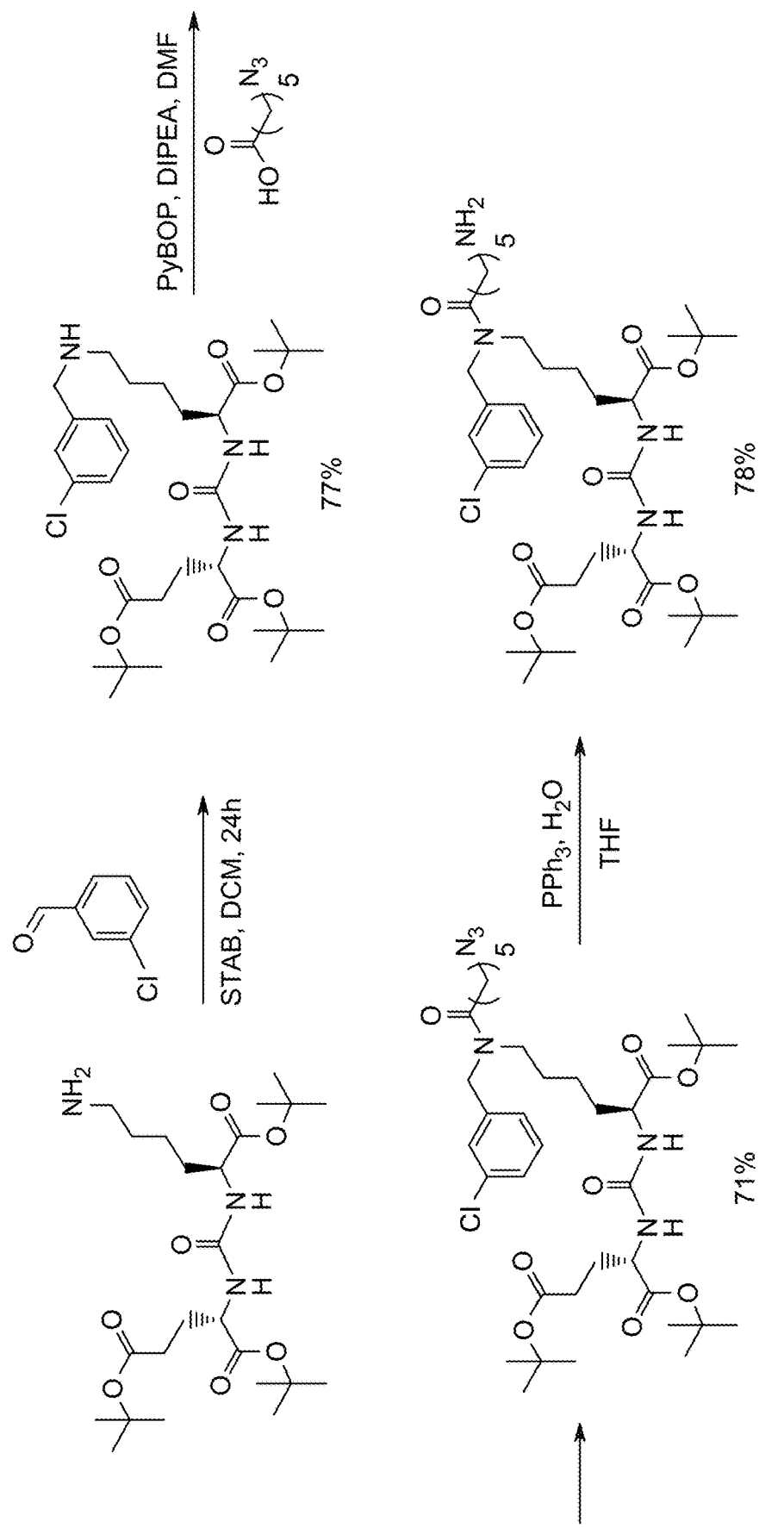
FIG. 10 describes a reduction reaction of the azido group to the amino group in THF/water medium.

Next, the reduction reaction of the azido group to the amino group in THF/water medium with a water content of at least 10 vol. % in which the resulting azido-derivative and triphenylphosphine are dissolved, taken from the calculation that at least 1 molar equivalent or the azido-derivative takes at least 1.5 molar equivalents of triphenylphosphine, as well as at least 50 molar equivalents of solvent mixture (THE/water) on the water. The reaction mixture was heated at a temperature of at least 45° C. until the starting azido derivative disappeared. The solvent was removed under reduced pressure: Purification was performed by the column chromatography method (trethylamine: methylene chloride: methanol: from 1%: 98%: 1% to 1%: 89%: 10%) FIG. 10).

Preferably, DMF or DMSO is used as the polar aprotic solvent.

Preferably, diisopropylethylamine or triethylamine is used as the non-nucleophilic base.

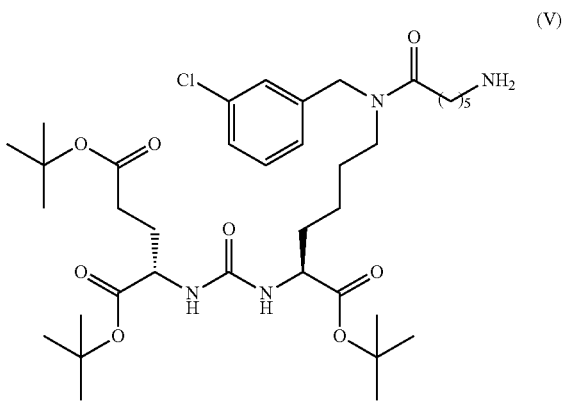

(V)

Linker fragment modification with a succinic anhydride representing an alkyl fragment containing 5 carbon atoms to obtain a compound derivative (V) acylated by succinic anhydride, In this case, the linker fragment modification by a succinic anhydride, which represents an alkyl fragment containing 3-5 carbon atoms, is carried out by an acylation reaction with succinic anhydride of the amino group in the presence of non-nucleophilic bases. Diisopropylethylamine or triethylamine is used as non-nucleophilic bases.

The reaction of acylation with succinic anhydride is carried out in a non-polar aprotic solvent medium by dissolving the starting amine (V), succinic anhydride and non-nucleophilic base, calculated on the basis that 1 amine mole equivalent requires at least 1 molar equivalent of succinic anhydride and non-nucleophilic base, as well as not less than 100 molar equivalents of non-polar aprotic solvent, the resulting mixture is stirred at room temperature until the starting amine (V) disappears.

Preferably, dichloromethane or chloroform is used as the non-polar aprotic solvent.

Preferably, diisopropylethylamine or triethylamine is used as the non-nucleophilic base.

Production of dipeptides of aromatic amino acid derivatives, which represent phenylalanyl-tyrosine, for binding the modified linker fragment of the compound of formula (V).

Figure 11:
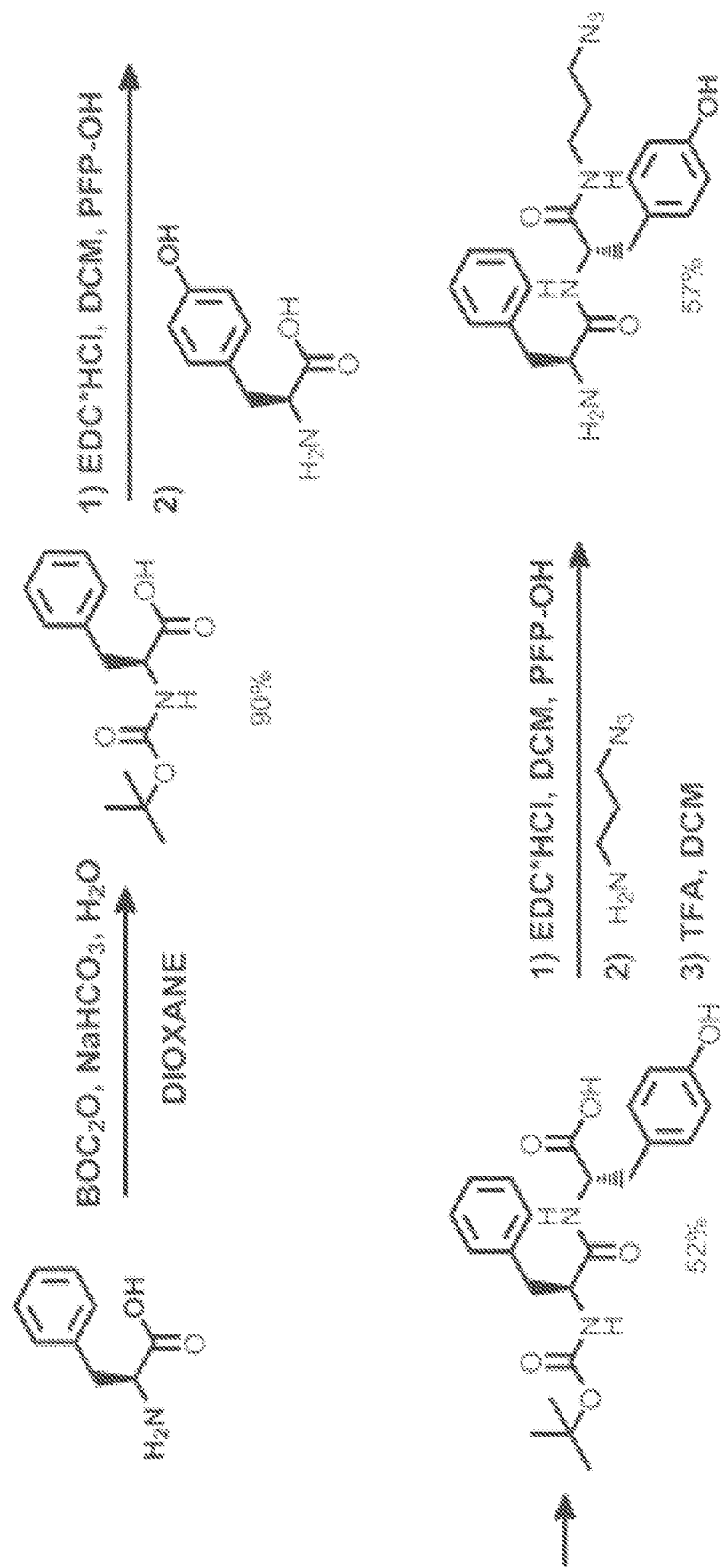
FIG. 11 describes synthesis of a PSMA vector fragment based on the L-phenylalanyl-L-tyrosine dipeptide derivative (L-Phe-L-Tyr, VI).

The synthesis of the dipeptide (VI) is illustrated in the diagram shown in FIG. 11.

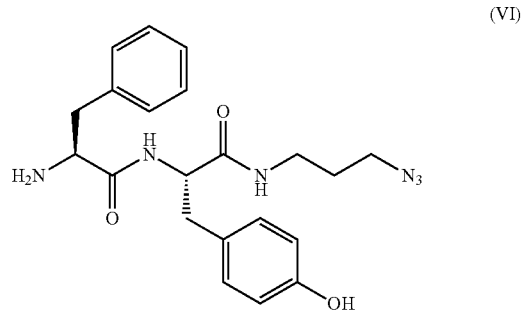 [SMILES: [N-]=[N+]=NCCCNC(=O)[C@H](Cc1ccc(O)cc1)NC(=O)[C@@H](N)Cc1ccccc1]

(VI)

Synthesis of a PSMA vector fragment based on the L-phenylalanyl-L-tyrosine dipeptide derivative (L-Phe-L-Tyr, VI) was earned out according to the diagram (FIG. 11). The base of amount of at least one molar equivalent of 2-tert-butyl dicarbonate BOC$_2$O of amount no less than one mole equivalent was added in the suspension of L-phenylalanine in a solvent mixture of dioxane—water with a water content of not less than 40% v/v at a temperature not exceeding, 5° C. The resulting mixture was stirred at room temperature for at least 4 days. The reaction mixture was concentrated under vacuum of a rotary evaporator until the organic solvent was removed. Then a hydrochloric acid solution with a concentration of at least 1 mol/L was added to the aqueous residue up to pH not more than 4 and extracted by ethyl acetate. The combined organic phase was washed with a saturated solution of NaHCO$_3$ and NaCl, dried with Na$_2$SO$_4$ and concentrated in vacuum. Then it was repeatedly boiled off with dichloromethane. The reaction product was obtained as a colorless amorphous substance.

Preferably, sodium bicarbonate, sodium carbonate, sodium hydroxide or potassium hydroxide was used as the base.

EDC.HCl (at least 1 eq.), PFPOH (at least 1 eq.) was added to the compound solution Boc-L-Phe in dichloromethane and stirred for at least 12 hours at room temperature. Further purification was performed using column chromatography on a silica gel column (eluent—dichloramethane), followed by vacuum concentration of the obtained fraction. The reaction product (yellow oily substance) was dissolved in a mixture of THF—water (at least 30% volume of water), and L-tyrosine (at least 1 eq.) was added while stirring. A solution of a non-nucleophilic base (at least 1 eq.) was dripped to the obtained solution and that was stirred for at least 12 hours at room temperature. Upon completion of the reaction, the reaction mixture was concentrated under vacuum of a rotary evaporator until complete removal of the organic solvent. The residue in the flask was acidified with a solution of HCl with a concentration of at least 1 mol/L up to pH of at least 4 and extracted by ethyl acetate. The combined organic phase was washed with a saturated solution of NaHCO$_3$ and NaCl, dried with Na$_2$SO$_4$ and concentrated in vacuum. The obtained colorless amorphous residue was dissolved in a minimum amount of dichloromethane, and hexane was dripped while stirring until the precipitation ceased. The precipitate was filtered and resuspended in hexane in an ultrasound bath, then re-filtered again.

Preferably, diisopropylethylamine or triethylamine was used as the non-nucleophilic base.

At the third stage, the process of compound Boc-L-Phe-L-Tyr carboxyl group activation was repeated, followed by interaction with azidopropylamine (at least 1 eq.) for at least 24 hours at room temperature in dichloromethane. At the end, the crude reaction mass was chromatographed on a silica gel column, and an intermediate dipeptide amide was obtained, which was invoked in the removal reaction of tort-butoxycarbonyl protection with a 10% vol. solution of trifluoroacetic acid in anhydrous dichloromethane.

Adding TFA was carried out with cooling in a water bath with ice at a temperature of not more than 10° C. followed by gradual heating of the reaction mixture to room temperature. Deprotection should be carried out at room temperature for at least 3 hours.

Figure 12:
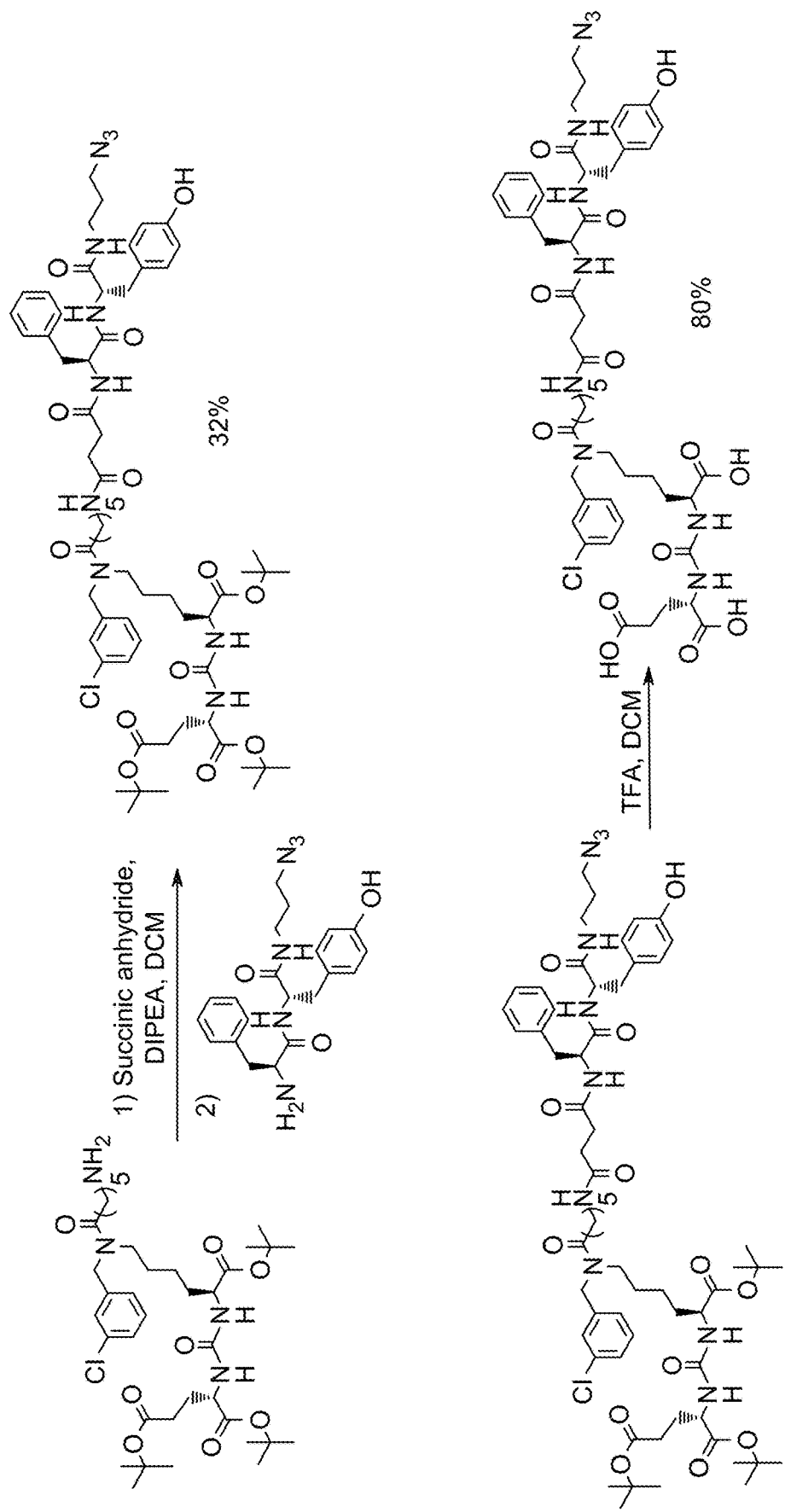
FIG. 12 describes preparation of 3-tert-butyl compound derivative of the PSMA-binding ligand and modified hydrophobic peptide linker comprising 6-aminohexanoic acid fragments, a phenylalanine fragment and a tyrosine fragment of the general formula (VII) was carried out by forming the amide bond of the acylation product of succinic anhydride and &peptide formula (VI).

Thus, as a result of the reaction sequence according to the transformation scheme, the synthesis of L-phenylalanyl-L-tyrosine dipeptide derivative (L-Phe-L-Tyr) (VI) was carried out, which was subsequently used to obtain highly specific PSMA vectors. The developed synthesis methods are distinguished by environmental compatibility, good. yields of target products, high selectivity of processes and do not require the use of special equipment or expensive reagents. The preparation of 3-tert-butyl compound derivative of the PSMA-binding ligand and modified hydrophobic peptide linker comprising 6-aminohexanoic acid fragments, a phenylalanine fragment and a tyrosine fragment of the general formula (VII) was carried out by forming the amide bond of the acylation product of succinic anhydride and dipeptide formula (VI) (FIG. 12).

At least 1 equivalent of dipeptide, HOBT, HBTU and a non-nucleophilic base were added to a solution of the acylation product with succinic anhydride in DMFA. The mixture was stirred for at least 24 hours. The solvent was then removed under reduced pressure. The product was isolated using column chromatography. Eluent—EtOAc/MeOH=5:1.

Preferably, diisopropylethylamine or triethylamine was used as the non-nucleophilic base.

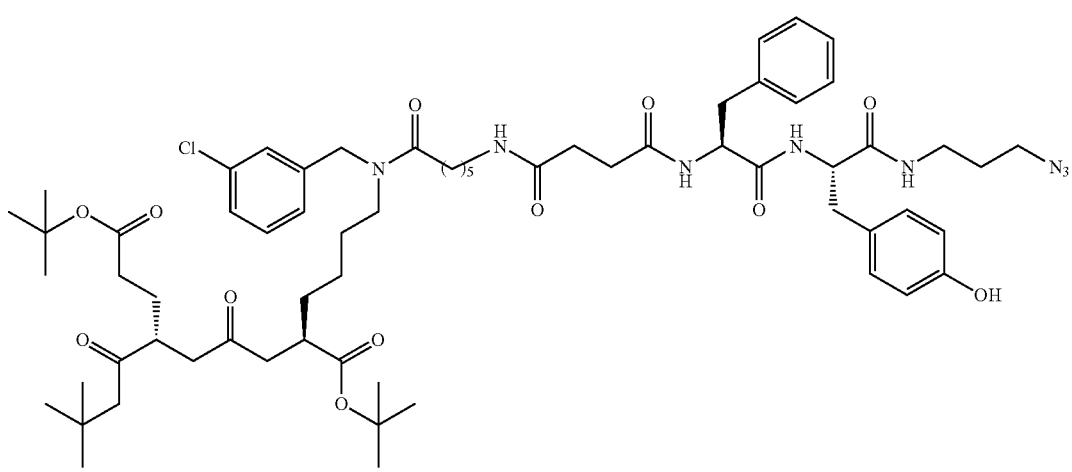

(VII)

The preparation of a compound of the PSMA-binding ligand radical and modified hydrophobic peptide linker of general formula (II) was carried out by removing the 3-tert-butyl protecting groups of the compound of formula (VII). Removal of 3-tert-butyl protecting groups was carried out in the presence of 9-11% TFA for 15-17 hours in dichloromethane (FIG. 12.

Figure 13:
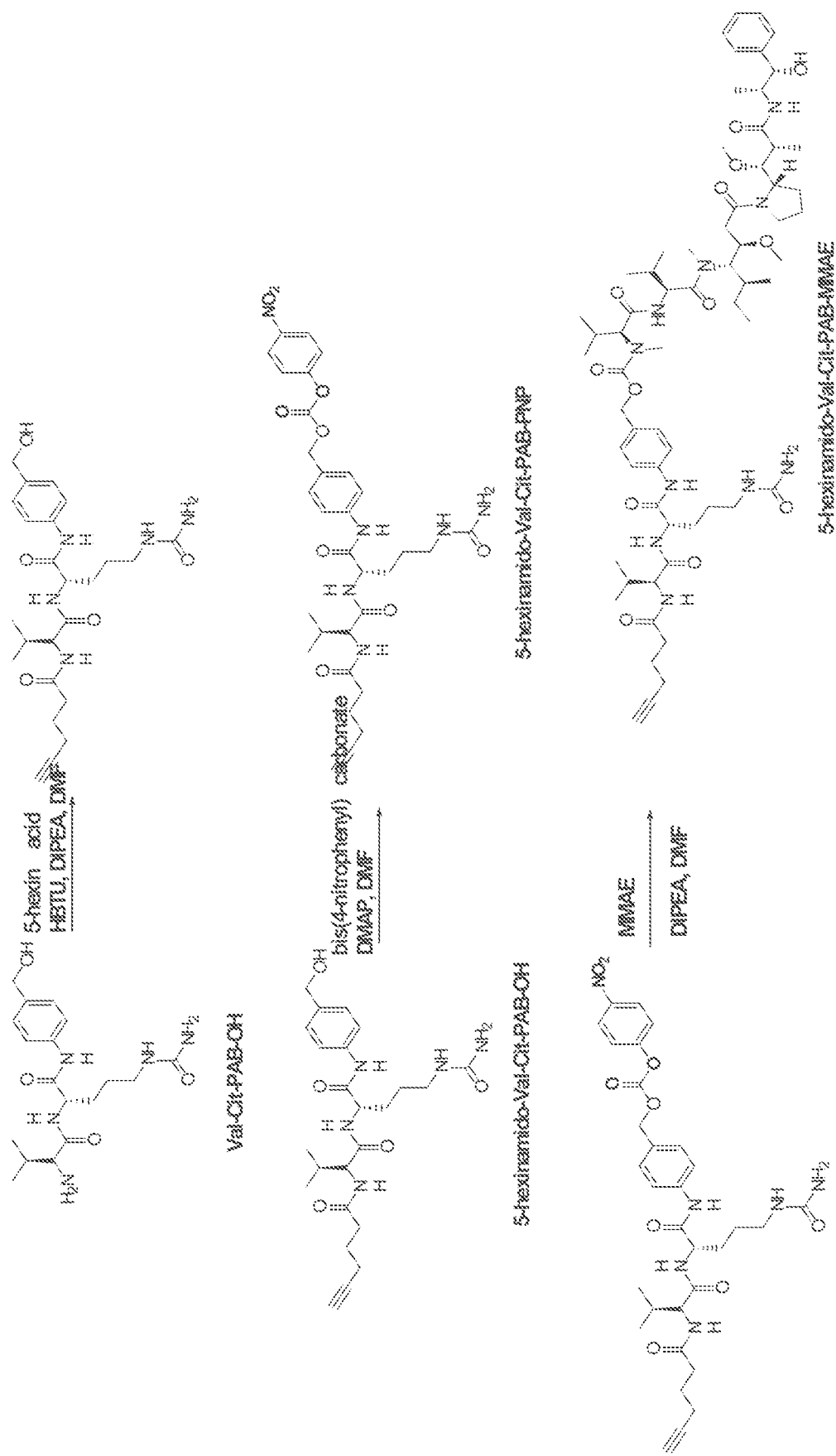
FIG. 13 describes obtaining an individual compound 5-hexinamido-Val-Cit-PAB-OH (VIII).

The modified Val-Cit-PAB-OH (VIII) derivative was obtained using 5-hexenoic acid acylation. At least 1 equivalent of 5-hexenoic acid, HBTU and a non-nucleophilic base were added to the modified dipeptide solution in DMFA. The mixture was stirred for at least 24 hours. The solvent was then evaporated under reduced pressure. The specificity of individual targeting compound isolation is the precipitation of the formed reaction mixture using ethyl acetate and ultrasound bath and following filtration. The individual compound 5-hexinamido-Val-Cit-PAB-OH (VIII) was finally obtained (FIG. 13).

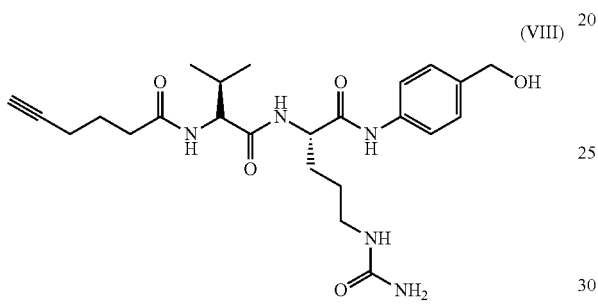

(VIII)

The further modification of 5-hexinamido-Val-Cit-PAB-OH was performed using a reaction of mixed carbonate formation. At least 3 equivalent of bis(4-p-nitrophenyl) carbonate, and also non-nucleophilic base were added to 5-hexinamido-Val-Cit-PAB-OH solution in. DMFA. The mixture was stirred for at least 5 hours. The reaction mixture was then evaporated under reduced pressure. The specificity a individual targeting compound isolation is the precipitation of the formed reaction mixture using ethyl acetate and ultrasound bath and following filtration. The individual compound 5-hexinamido-Val-Cit-PAB-PNP (IX) was finally obtained (FIG. 13).

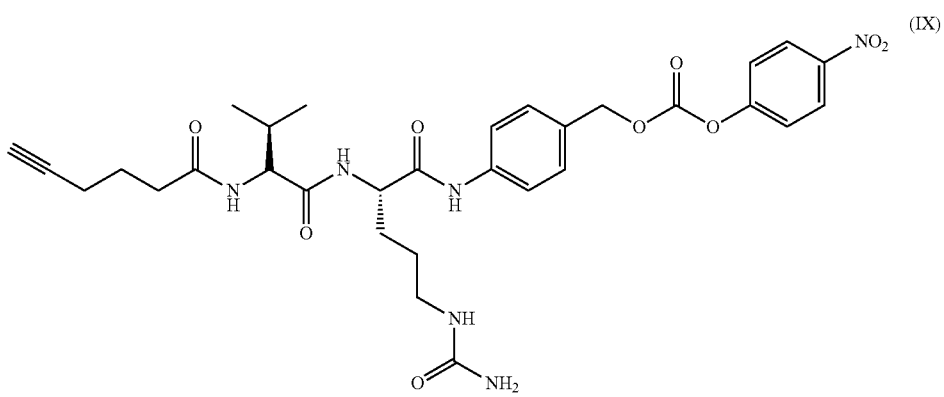

(IX)

The further modification of 5-hexinamido-Val-Cit-PAB-PNP was performed using a reaction of carbamate formation with monomethyl auristatin E. At least 1 equivalent of MMAE, non-nucleophilic base, and also HOBt catalytic amounts were added to 5-hexiniamido-Val-Cit-PAB-PNP solution in DMFA. The mixture was stirred for at least 16 hours. The reaction mixture was then evaporated under reduced pressure. Further compound purification was performed by formed reaction mixture precipitation using ethyl acetate and ultrasound bath and following filtration. The individual 5-hexinamido-Val-Cit-PAB-MMAE (X) compound was isolated using the preparative reversed-phase chromatography (FIG. 13).

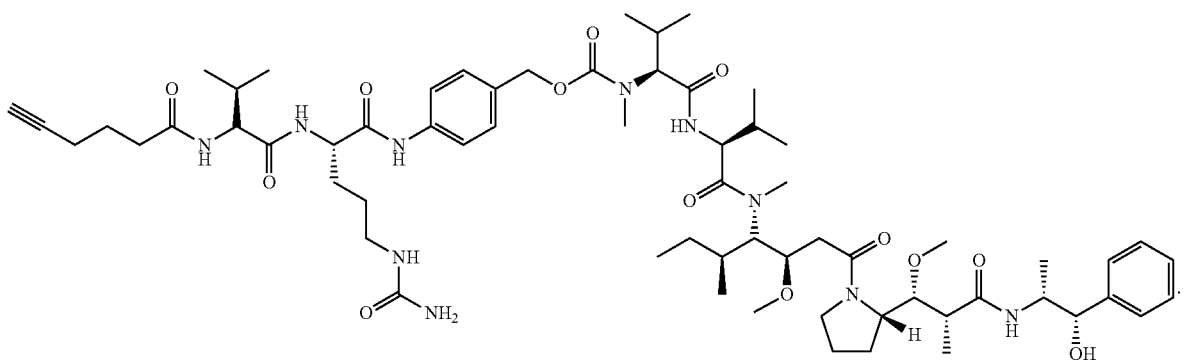

(X)

Figure 14:
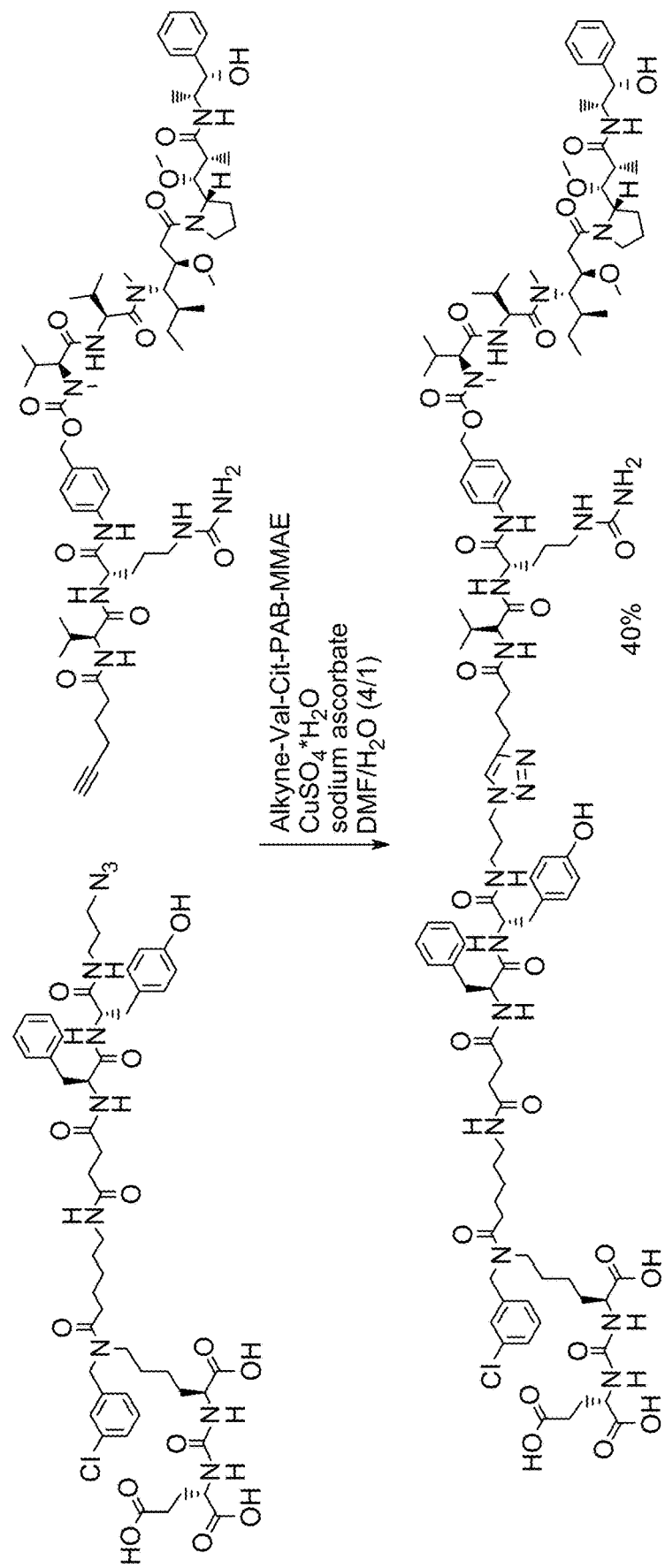
FIG. 14 describes preparation of the conjugate of formula (I) as carried out by the reaction of an azide-alkyne cycloaddition catalyzed by copper ions (I) obtained in situ.

The preparation of the conjugate of formula (I) is carried out by the reaction of an azide-alkyne cycloaddition catalyzed by copper ions (I) obtained in situ. The reaction is carried out using 0.1-1 molar equivalents of copper sulfate pentahydrate (relative to ligand II) and 0.3-3 molar equivalents of sodium ascorbate in a DMF/H$_2$O mixture (4:1 concentration) with a water content of 10-50 vol. as well as 0.9-1.1 molar equivalents of a derivative of 5-hexinamido-Val-Cit-PAB-MMAE (X), containing a terminal alkyne group (FIG. 14).

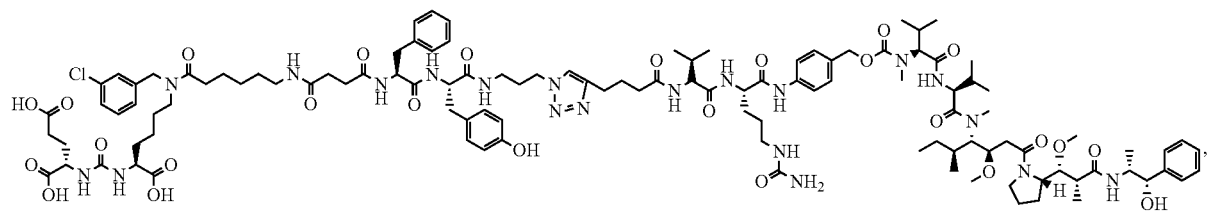

(I)

Conjugate (I) can be used separately or in combination with other compounds suitable for the diagnosis, visualization and or treatment of diseases caused by PSMA expressing cells.

The compounds of the present invention may be used for therapy of nearly all solid tumors expressing PSMA, including lung tumor, renal cell tumor, glioblastoma, pancreatic tumor, bladder tumor, sarcoma, melanoma, breast tumor, colon tumor germ cell tumor, pheochromocytoma, esophageal and gastric tumors. Also, in accordance with the present invention, it is possible to visualize some benign lesions and tissues, including endometria and the chronic peptic esophageal ulcer (Barret syndrome).

PSMA is often expressed in capillary vascular endothelial cells in the peritumoral and intratumoral regions of various malignant tumors, thus the compounds of the present invention and therapy methods using such compounds are suitable for treatment of these malignant tumors.

The term "pharmaceutically acceptable" refers to a nontoxic material that does not interact with the action of the active ingredient of the pharmaceutical composition. The "Pharmaceutically acceptable carrier" refers to a biocompatible solution, which sufficiently has characteristics such as sterility, p[Eta], isotonicity, stability and the similar ones, and may include any solvents, diluents including a sterile saline, sodium chloride solution for injection, Ringer's solution for injections, dextrose solution for injections, dextrose solution and sodium chloride for injections, Ringer's lactate solution for injections and other aqueous buffer solutions, dispersive media, coatings, antibacterial and antifungal agents, isotonic agents and the similar ones. A pharmaceutically acceptable carrier may also contain stabilizers, preservatives, antioxidants, or other additives that are well known for the specialists of the certain area, or other excipient known in the technology.

Figure 15:
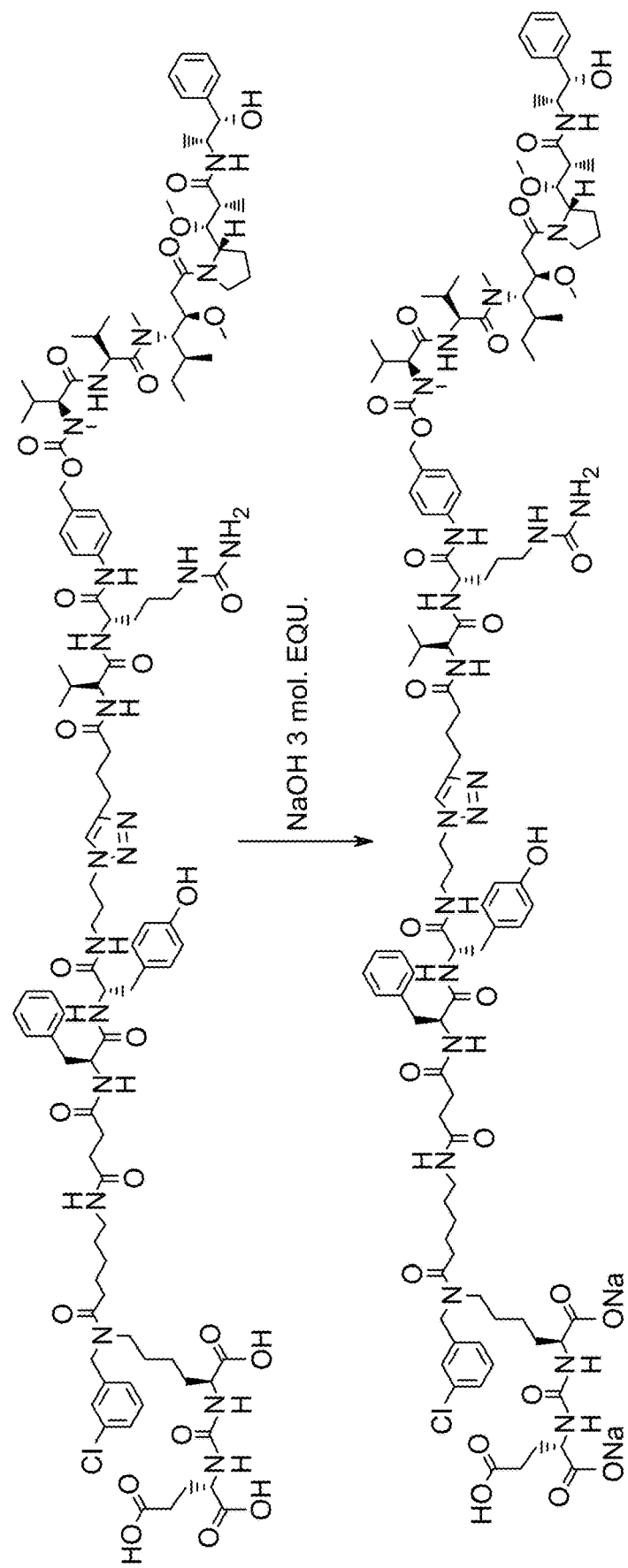
FIG. 15 describes an example of Conjugate (I) sodium salt obtaining using sodium hydroxide.

The "Pharmaceutical acceptable salts" refer to derivatives of disclosed compounds where the parent compound is modified so as to obtain non-toxic acid or base salts of this compound. The pharmaceutically acceptable salts of the present invention can be synthesized from the parent compound, which contains three acidic groups, by conventional chemical methods, Typically, such salts can be obtained by reacting the free acid form of these compounds with a stoichiometric amount of a suitable base (such as hydroxide, carbonate, Na, Ca, Mg bicarbonate or the similar ones) or by reacting the free base form of these compounds with a stoichiometric amount of a suitable acid. Such reactions are typically carried out in water or in an organic solvent, or in a mixture of the two mentioned above solvents. Non-aqueous media such as ether, ethyl acetate, ethanol, isopropanol, or acetonitrile are generally used where feasible. You can find a list of additional suitable salts, for example, in Remington's Pharmaceutical Sciences, 17th ed., Mack Publishing Company, Easton, Pa., p. 1418 (1985), The example of Conjugate (I) sodium salt obtaining using sodium hydroxide is presented in FIG. 15

There is a more detailed description of the claimed invention below, The present invention may undergo various changes and modifications understood by a specialist based on the reading of this description. Such changes do not limit the scope of claims.

EXAMPLES

Having generally described this invention, a further understanding can be obtained by reference to certain specific examples which are provided herein for purposes of illustration only, and are not intended to be limiting unless otherwise specified.

Example 1

Synthesis of (3S,7S,25S,28S)-25-benzyl-33-(4-(4-(((R)-1-(((S)-1-((4-((5S,8S,11S,12R)-11-((S)-sec-butyl)-12-(2-((S)-2-(((1R,2R)-3-(((1S,2R)-1-hydroxi-1-phenylpropan-2-yl)amino)-1-methoxi-2-methyl-3-oxopropyl) pyrrolidine-1-yl)-oxoethyl)-5,8-diisopropyl-4,10-dimethyl-3,6,9-trioxo-2,13-dioxo-4,7,10-triazatetradecyl)phenyl)amino)-1-oxo-5-ureidopentan-2-yl)amino)-3-methyl-1-oxobutan-2-yl) amino)-4-oxobutyl)-1H-1,2,3-triazol-1-yl)-12-(3-chlorbenzyl)-28-(4-hydroxybenzyl)-5,13,20,23,26,29-hexaoxo-4,6,12,19,24,27,30-heptaazatritracontan-1,3,7-tricarboxylic acid (Conjugate (I) (FIG. 14)

Compound (II) (75 mg., 0.71 mmol) was dissolved in the mixture 3:1 of DMFA and water (12 mL). Fill the flask with argon. Further add the modified MMAE (X) (83 mg., 0.068 mmol), sodium ascorbate (16 mg., 0.082 mmol) and cupric sulfate pentahydrate (7 mg., 0.027 mmol). The mixture was stirred for 24 hours. Further add an ethylenediaminetetraacetic acid (16 mg. 0.054 mmol) and stir the reaction mixture for another 1 hour. Then evaporate the solvent. Carry out the further purification by means of reversed phase chromatography method: Puriflash 15C18HP-F0012, water/acetonitrile system, 5% to 100% of acetonitrile for 25 minutes, then wash with methanol for 5 minutes, flow rate—20 mL/min.

Conjugate (I) was isolated as a white amorphous powder, the yield was 120 mg (78%).

Figure 1:
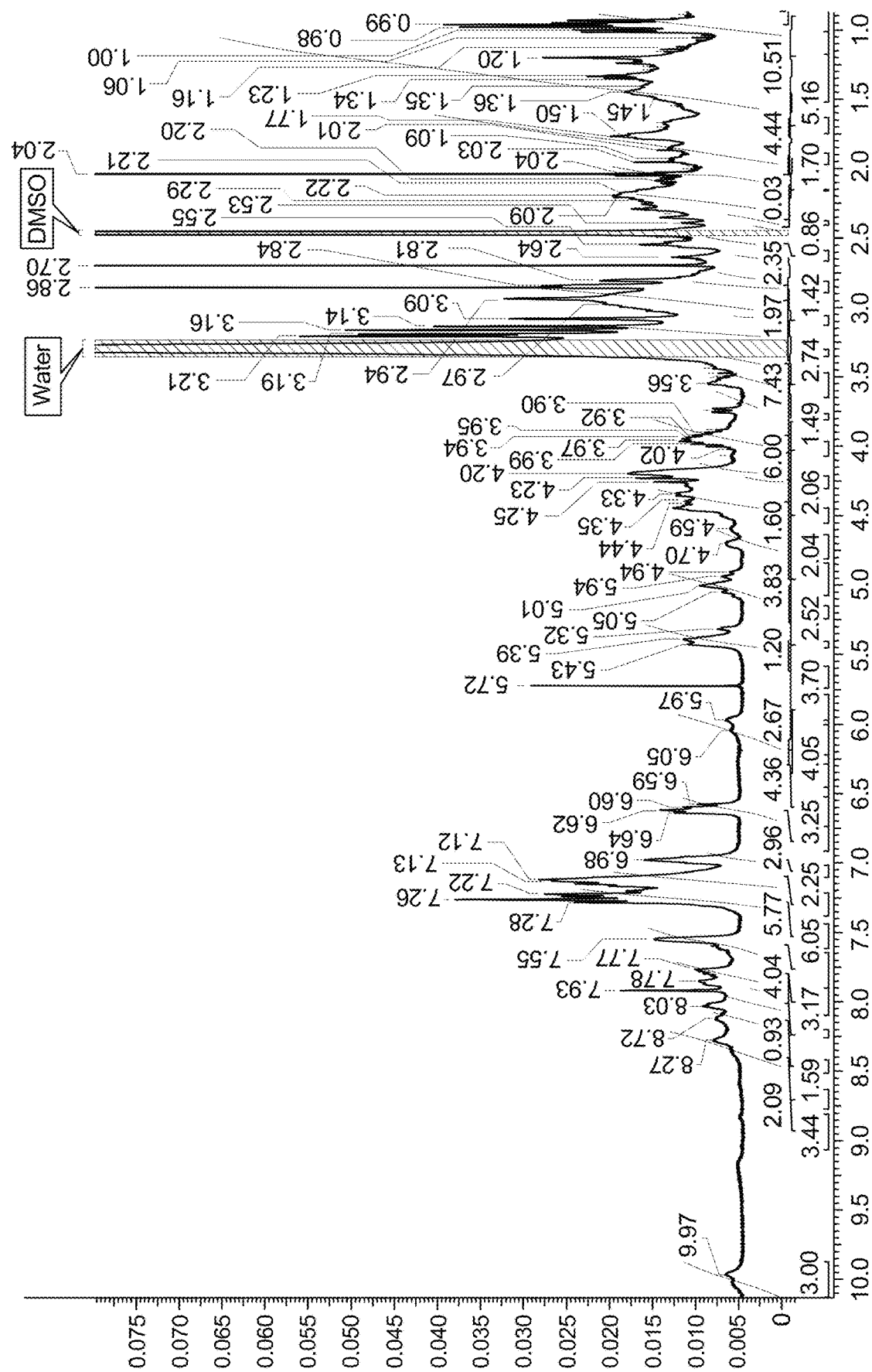
FIG. 1 shows the $^1$H NMR Conjugate (I) spectrum (abscissa axis—chemical shift (ppm), ordinate axis—normalized intensity).

An NMR spectrum of $^1$H Conjugate (I) (400 MHz, DMSO-d6, δ, ppm) is shown in FIG. 1.

Figure 2D:
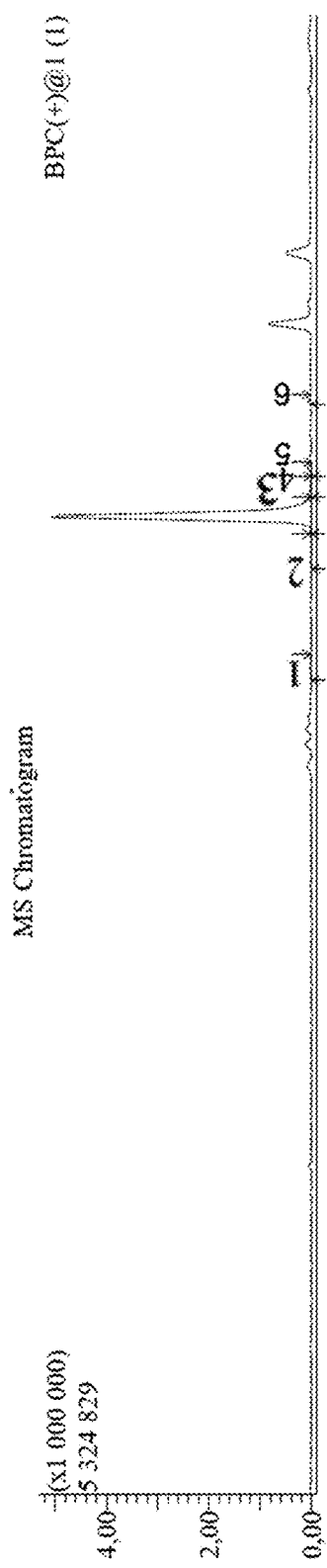
Figure 3:
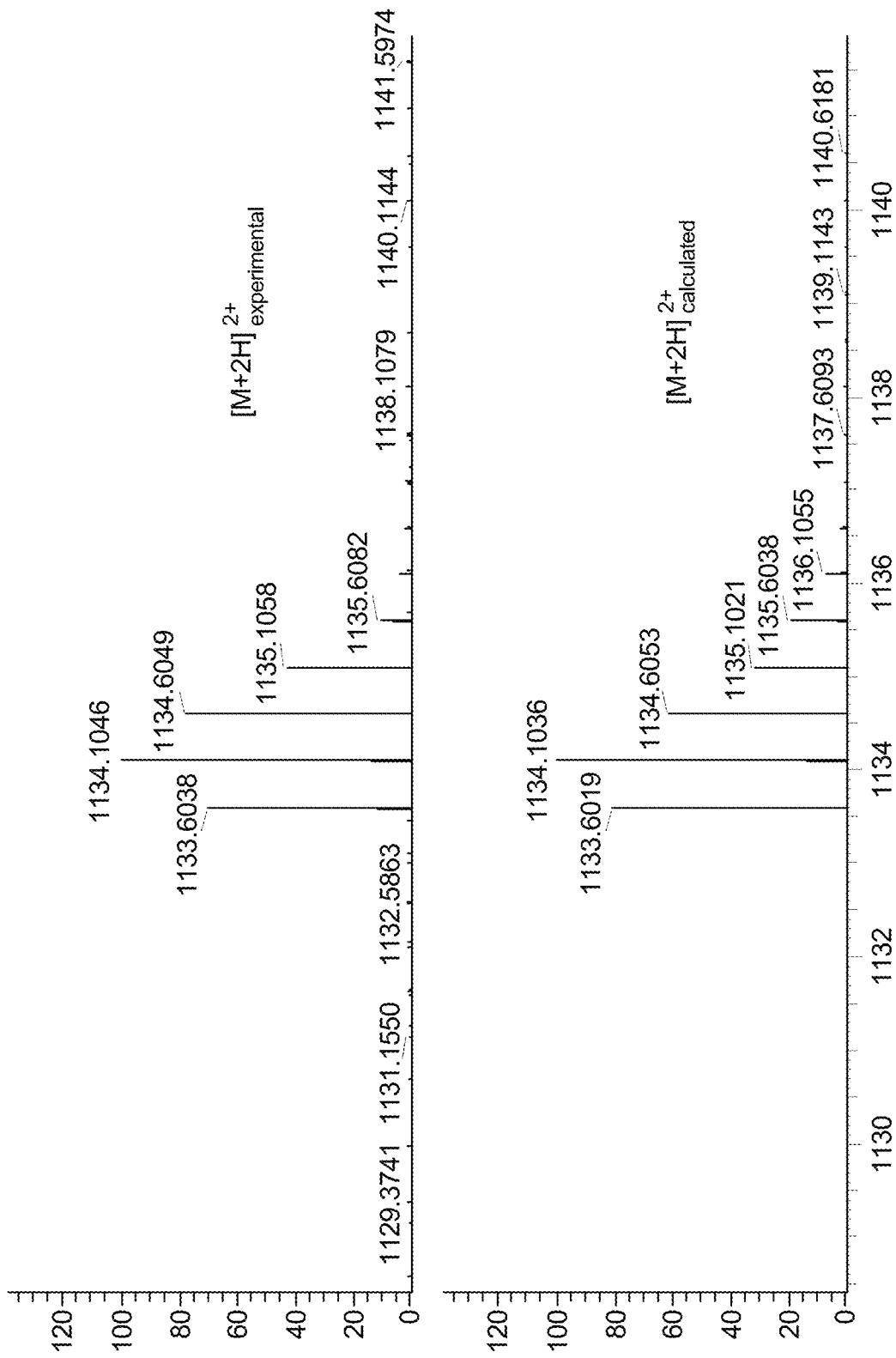
FIG. 3 shows the ESI HRMS mass spectrum of Conjugate compound (I) (abscissa axis is mass/charge ratio (m/z), ordinate axis is intensity).

9.97 (m, 3H), 8.28 (m, 3H), 8.12 (m, 2H), 8.03 (m. 2H), 7.92 (s, 1H), 7.77-7.85 (m, 3H), 7.55-7.60 (m, 4H), 7.20-7.28 (m, 6H), 7.12-7.17 (m, 6H), 6.98 (m, 2H), 6.58-6.64 (m, 3H), 5.97 (m, 3H), 5.32-5.43 (m, 4H), 4.91-5.05 (m, 4H), 4.59-4.70 (m, 3H), 4.33-4.44 (m, 4H), 4.25-4.23 (m, 1H), 4.20 (m. 3H), 3.88-4.02 (m, 4H) 3.73-3.75 (m, 2H), 3.50-3.55 (m, 2H), 3.14-3.21 (m, 6H), 3.08 (m, 2H), 2.94-3.03 (m, 7H), 2.84-2.86 (m, 2H), 2.76-2.81 (m, 4H), 2.63-2.68 (m, 1H), 2.49-2.55 (m, 2H), 2.35-2.39 (m, 2H), 2.20-2.30 (m, 4H), 1.99-2.11 (m, 5H), 1.67-1.96 (m, 11H), 1.06-1.55 (m, 17H), 0.90-1.02 (m, 5H), 0.71-0.85 (m, 16H) (FIG. 3.30),

HPLC chromatogram of Conjugate (I) compound (FIG. 2).

ESI HRMS of Conjugate (I) compound (FIG. 3).
m/z calculated for $C_{114}H_{165}ClN_{20}O_{26}$ $[M+2H]^{2+}$ 1134.1036, found: 1134.1046

Figure 4:
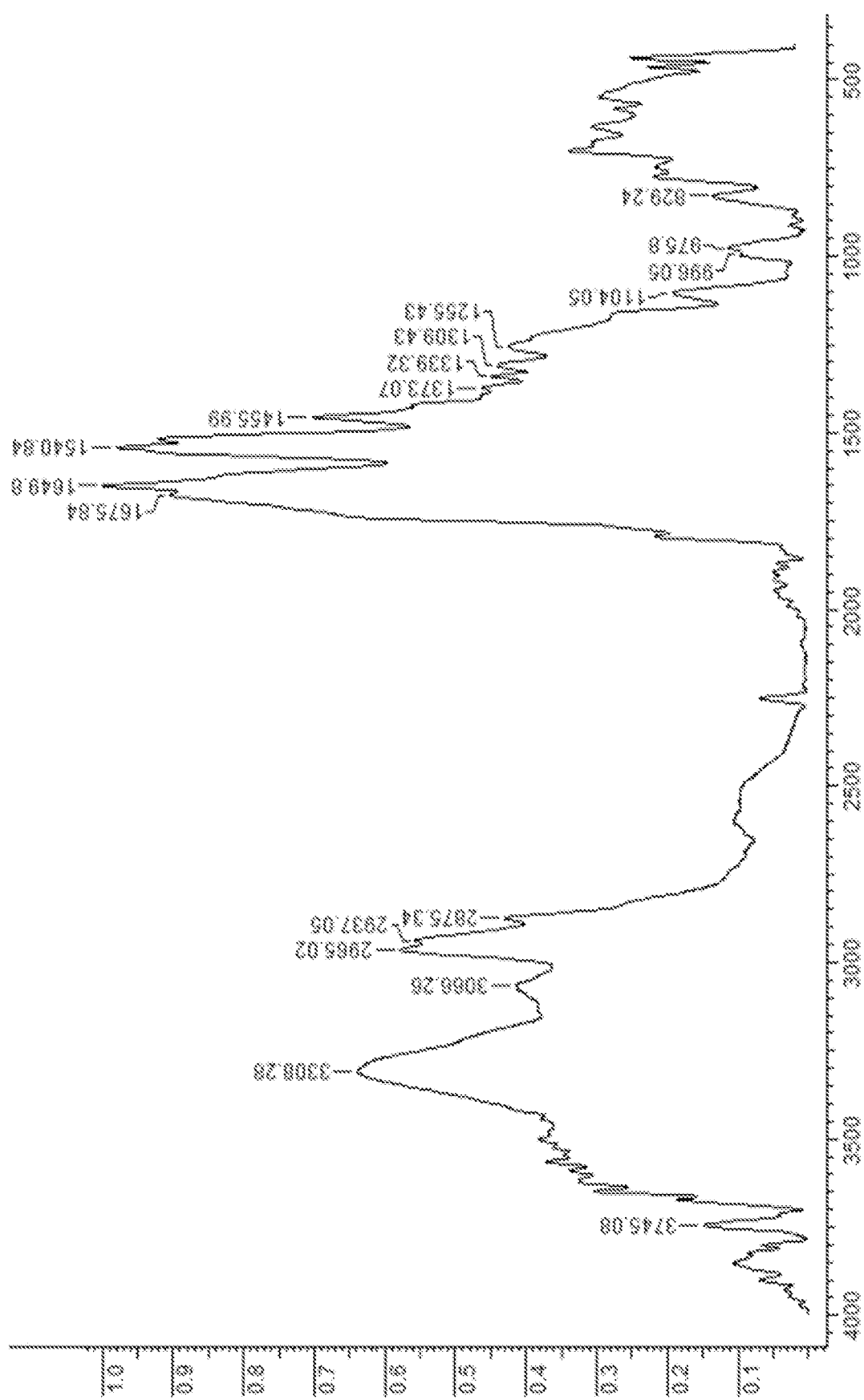
FIG. 4 presents infrared spectrum of Conjugate compound (1) (abscissa axis is wave length ($cm^{-1}$), ordinate axis is absorption intensity).

IR spectrum of Conjugate (I) compound: 3308.28 (NH), 2965.02 (Ar), 2937.05 (Ar). 2875.34 (Ar), 1675.84 (C(O)NH), 1649.80 (C(O)NH), 1540.84 (C(O)NH), 1516.14 (C(O)NH), (FIG. 4).

Example 2

The evaluation of antineoplastic Conjugate (I) efficacy on xenograft model of prostate cancer.

To study the drug efficacy the xenograft model was selected as a quite illustrative one for preclinical studies (Application of Prostate Cancer Models for Preclinical Study: Advantages and Limitations of Cell Lines, Patient-Derived Xenografts, and Three-Dimensional Culture of Patient-Derived Cells Takeshi Namekawa, Kazuhiro Kuniko Horie-Inoue, Satoshi Inoue Cells, 2019 January; 8(1), The criteria of antineoplastic activity were tumor growth inhibition (TGI) (Experimental assessment of antineoplastic agents in the USSR and USA/IEd. Ed. Sophyina Z. P., Syrkin A. B., Goldin F., Klein I.//J.: Medicine, 1980) in treated animals ($P_{on}$) compared with control ($P_k$), expressed as a percentage:

$$TPO = \frac{P_x - P_{on}}{P}, \%$$

The treatment in all groups was started when tumor nodes were appeared.

Group (TGC)

On Day 1 after treatment completion the group without any specific treatment had Vavg=165±83 mm$^3$, on Day 8—Vavg=1121±475, Tumor growth was $V_8/V_1$=6.8 times at the end of study.

Conjugate (I) 0.3 mg/kg group.

Figure 5:
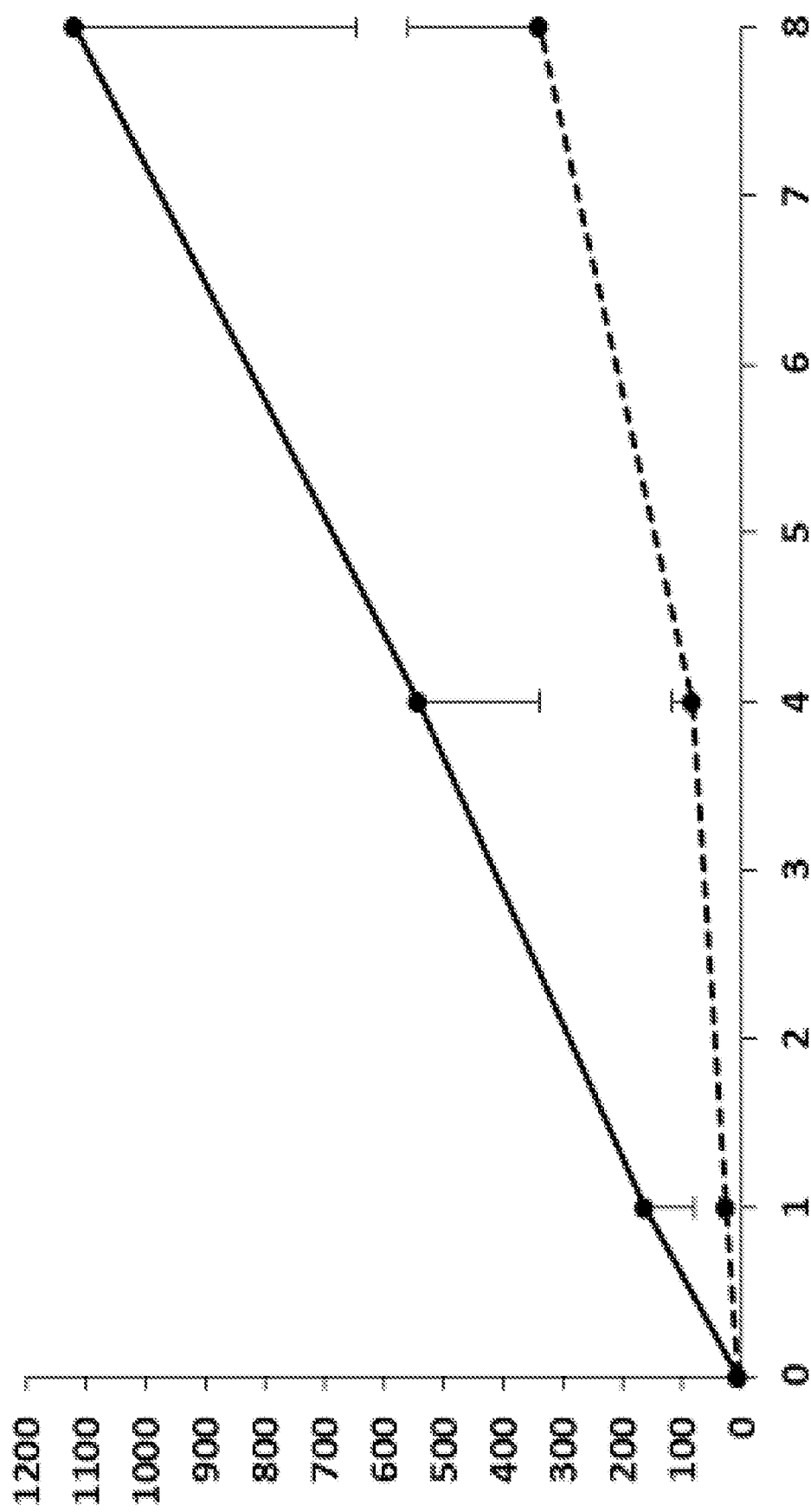
FIG. 5 shows dynamics of prostate cancer growth 22Rv1 under 3-time intraperitoneal Conjugate (I) administration in a dose of 0.3 mg/kg compared with control (TGC)(ordinate axis is a mean tumor volume (mm3), abscissa axis is a day after tumor transplantation (number of days)).

Using conjugate in a single dose of 0.3 mg/kg, on Day 1 after administration completion the effect achieved significant reliability criteria of TGI=83% (p<0.001) u maintained during all experimental period. on Day 4 TGI=85% (p<0.001) and on Day 8 after treatment completion TGI value achieved 70% (p<0.00.1) (FIG. 5, table 1). There were no death cases. Tumor growth was times at the end of study (Table 1).

Assessment of the Tolerability

The general health and mice behavior within and after agent intake in a dose of 0.3 mg/kg was satisfactory without any pathologic changes and gastrointestinal and any other toxicity, 100% survival (Table 2).

The study in vivo showed the presence of reliable antineoplastic effect for the product in a single dose 0.3 mg/kg: Conjugate (I)=85-70% p<0.05. The study in vivo showed that mice in Conjugate (I) 0.3 mg/kg group were tolerable and there were no death cases observed during all experiment—100% survival.

Example 3

The evaluation of Antineoplastic Activity of Conjugate (I) on Lymphoid Leukosis P388 and Melanoma B16 model.
Experiment No.1

Lymphoid Leukosis P388 (male mice BDF$_1$)—observation was held for 30 days since the first product administration (the product administration was started 24 hours after revaccination) and it was administered 3 times intraperitoneally in a day.

Test Doses

1. Group 1—tumor growth control (TGC)
2. Group 2—placebo (diluent)
3. Group 3—intraperitoneal Conjugate (I) administration in a dose of 0.5 mg/kg 3 times;
4. Group 4—intraperitoneal Conjugate (I) administration in a dose of 1.0 mg/kg 3 times:

Experimental animals of control group (TGC) were administered with 0.9% saline, the placebo group was injected with the diluent (DMSO+Haemodes) of similar volume. The antineoplastic activity was determined according to mice lifespan.

Figure 6:
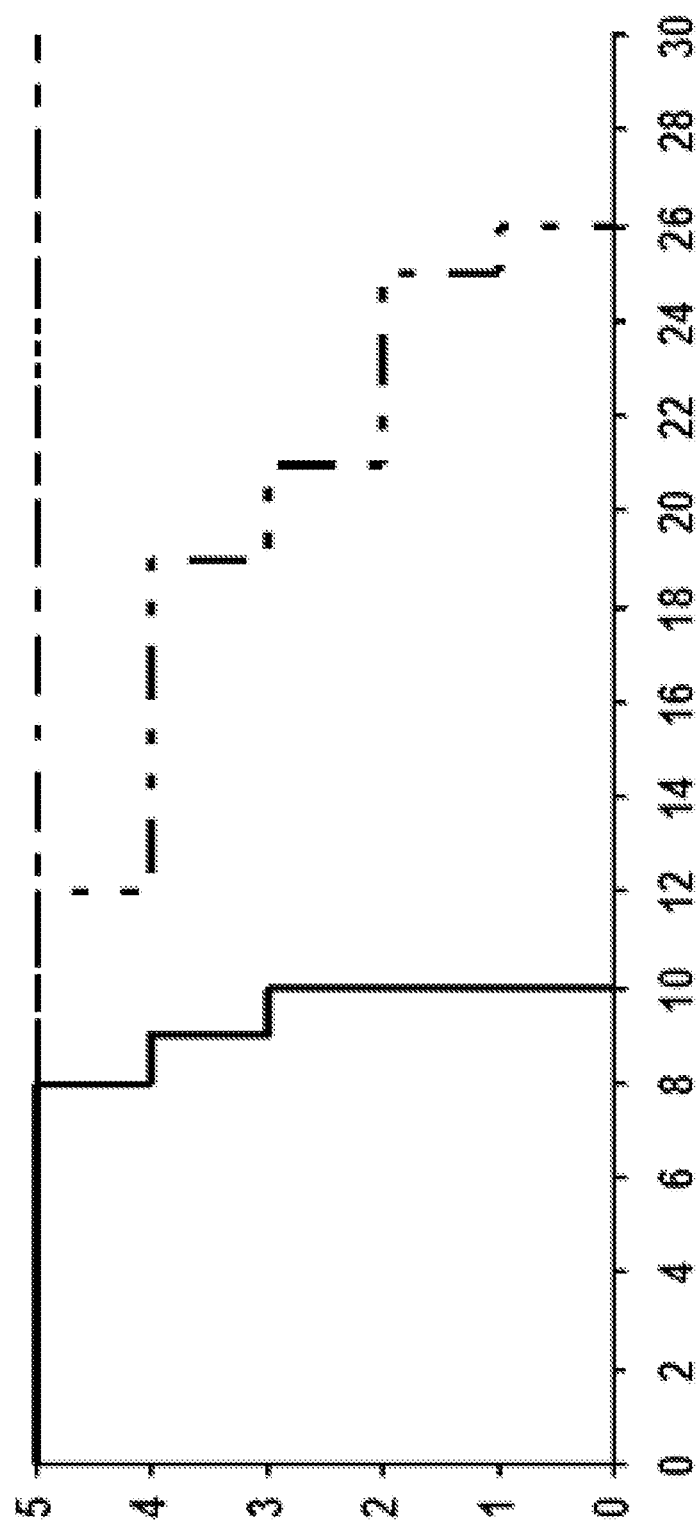
FIG. 6 presents the survival of mice with lymphoid leukosis P388 after intraperitoneal Conjugate (I) administration in a dose of 0.5 and 1 mg/kg compared with control (TGC) (ordinate axis is a number of mice (units), abscissa axis is a day after treatment (number of days)).

The results of lymphoid leukosis P388 model showed the presence of the antineoplastic activity in the Conjugate (I) dose or 0.5 and 1 mg/kg. The survival by 30 days of the experiment was 100% (FIG. 6, Table 4).

Experiment No.2

Melanoma B16-30 days after the first product administration (the product administration was started 48 hours after revaccination) and it was administered 3 times intraperitoneally in 5 days, Test Doses 1. Group 1—diluent (placebo)
2. Group 2—intraperitoneal Conjugate (I) administration in a dose of 1 mg/kg 3 times:

Experimental animals of control group (TGC) were administered with the diluent (DMSO+Haemodes) of similar Volume (placebo product). The measurement of tumor node was performed three times (on. Day 1, 4 and 8 after treatment completion), The antineoplastic activity was determined according to the standard parameters: tumor growth inhibition TGI (>50%). The survival observation was continued up to 30 days (Table 3).

Melanoma B16 model showed the presence of a reliable antineoplastic effect in a dose of 1.0 mg/kg: TGI max=75, 62 and 61% (Table 4).

Example 4

The pharmacokinetics study for the Conjugate (I) product in plasma of rabbits and rats after a single injection.

Figure 7:
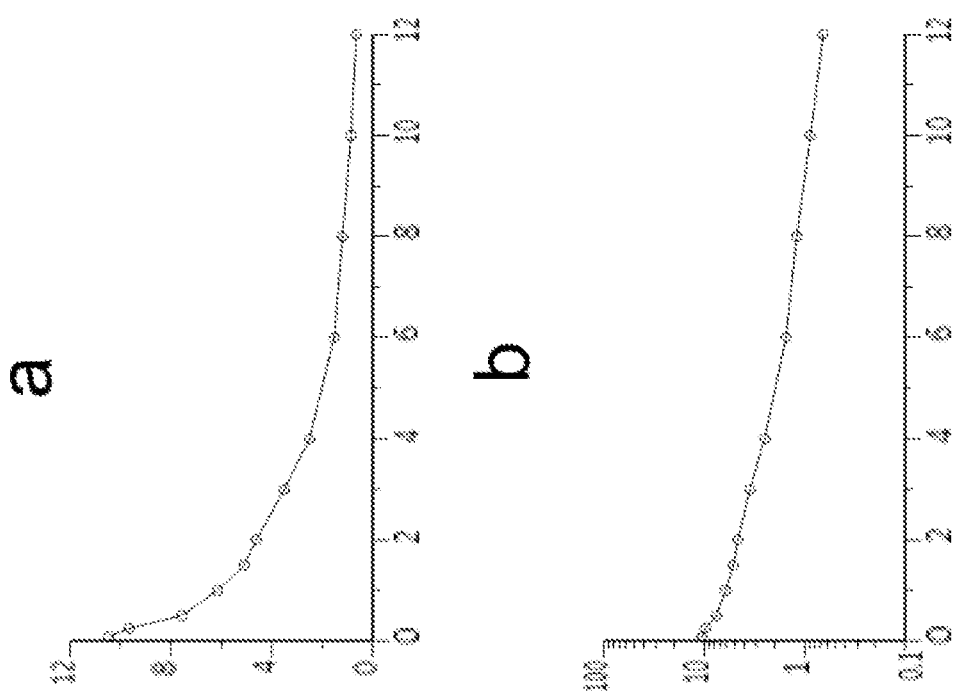
FIG. 7 demonstrates mean pharmacokinetic profiles within the study on rabbits (in linear and semi-log graphs). Ordinate axis is Conjugate (I) concentration (µg/mL), abscissa axis is time (hour), FIG. 8 demonstrates mean pharmacokinetic profiles within the study on rats (in linear and semi-log graphs). Ordinate axis is Conjugate (I) concentration (µg/mL), abscissa axis is time (hour).
Figure 8:
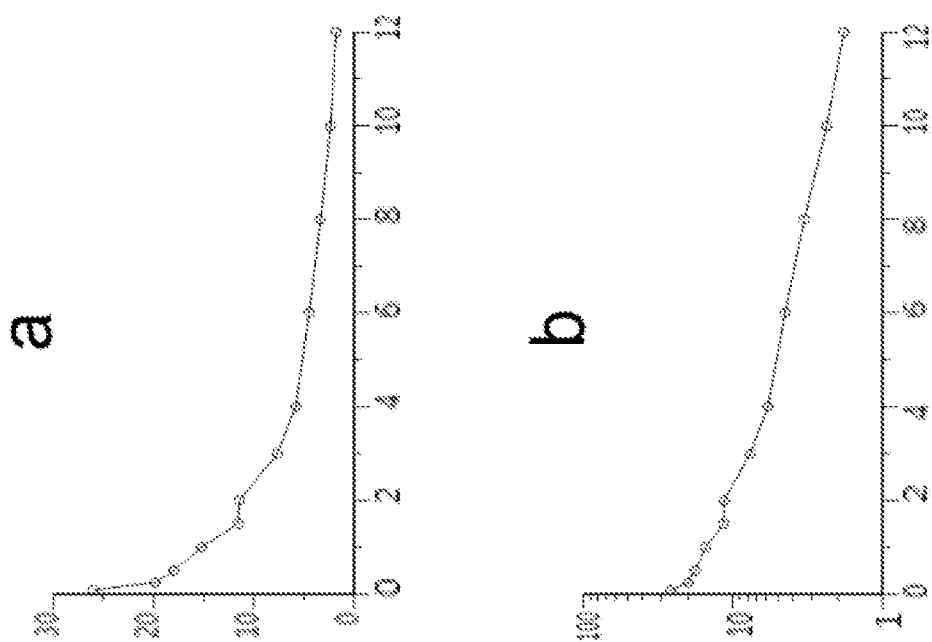

The leporids and rodents are the standard targets for preclinical studies of potential drug products as well as determining the pharmacokinetic parameters. The rabbits and rats are recommended as test systems to study pharmacokinetic properties of pharmaceutical products by the regulatory documents (FIG. 7, FIG. 8).

Rabbits

This study was performed on healthy awake male rabbits of the Soviet Chinchilla breed aged 2.5-3 months and with body weight range of 2.0-2.5 kg, The experiment included 7 rabbits per each product, the total number of animals was 21. The pharmacokinetic data, determined from this number of test animals, are sufficient to obtain the primary quantitative characteristics of test product distribution and elimination and the calculation of descriptive statistics parameters.

Rats

This study was performed on healthy awake white outbred mature male rats aged about 3 months with body weight of 190-210 g. The experiment included 7 rats per each product, the total number of animals was 21. The pharmacokinetic data, determined from this number of test animals, are sufficient to obtain the primary quantitative characteristics of test product distribution and elimination and the calculation of descriptive statistics parameters.

Conjugate (I) Test Product

Composition

1. Conjugate (1)
2. Solubilizer Pluronic F127—in the amount, five-fold greater than the conjugate amount by weight.
3, Diluent—Haemodes infusion solution.
   Dimethyl sulfoxide—in the amount of 5% of the prepared volume.
   Rabbit experiment (see Tables 5, 6),
   Rat experiment (see Tables 7, 8).

Example 5

Acute toxicity study of Conjugate (I) product on mice and rats.

Composition

1. Conjugate (I).
2. Solubilizer Pluronic F127—in the amount, five-fold greater than the conjugate amount by weight.
3. Diluent Haemodes infusion solution.
4. Dimethyl sulfoxide—in the amount of 5% of the prepared volume.

Species, line, number of animals.

The experiment took white outbred male mice aged about 2 months with body weight of 19-21,g, and also white outbred mature male rats aged about 2 months with body weight 190-210 g.

Acute toxicity study was performed within the intravenous administration. Before the start of the experiment to determine an acute toxicity, the animals were deprived of food and water (mice were deprived for 2 hours, rats—for 10-12 hours), and then weighed. Then each animal received the intravenous drug injection according to the study design, in a volume not exceeding the acceptable single injection volume: 0.5 mL for mice, 2 mL for rats, and fractionally if necessary. The control group of animals received Pluronic solution in Haemodes in the proportion used fort dose preparation of 78 mg/kg for mice and 38 mg/kg for rats. The duration of observation for laboratory animals was 14 days. During this period, visible signs of intoxication were assessed (see Table 9).

The correlation between fatality and product dose for male mice is provided in Table 10.

Table 11 showed the dynamics of body weight of male mice for survived animals in groups of 3 and 5 mg/kg and also in control group. The body weight dynamics evaluation for doses more than 5 mg/kg was not useful due to a small number of survived animals. The decreased growth rate or decreased body weight regarding the initial one was observed for all test doses.

The result of acute toxicity study confirmed the median lethal dose for mice (6.3 mg/kg) and the maximum tolerated dose for mice (3 mg/kg).

The toxic effect in mice was accompanied by the renal damage, decreased motor activity, dose-dependent hindlimb paresis. There were gastronintestinal hemorrhages within large doses, the decreased motor activity resulting in adynamia was observed within maximum doses, however, morphologic organ changes were not formed (Table 12).

The correlation between fatality and product dose for male rats is provided in Table 13.

Table 14 showed the dynamics of body weight of male rats for survived animals in groups of 3 and 4 me kg and also in control group. The body weight dynamics evaluation for doses more than 5 mg/kg was not useful due to a small number of survived animals. The decreased growth rate or decreased body weight regarding the initial One was observed for all test doses:

The result of acute toxicity study confirmed the median do for rats (4.9 mg/kg) and the maximum tolerated dose for rats (4 mg/kg).

The toxic effect in mice was accompanied by the renal damage, decreased motor activity, dose-dependent hindlimb paresis. There were gastrointestinal hemorrhages within large doses, the decreased motor activity resulting in adynamia was observed within maximum doses, however, morphologic organ changes were not formed.

The toxic effect in rats is accompanied by a leading, symptom as diarrhea and the renal damage. Some animals had a hypertrophic spleen. There was a significant decreased motor activity, liver damage, porphyrin discharge from the eye and nose mucous membranes when large doses administered.

Example 6

Chronic toxicity study of Conjugate (1) product on Rats and rabbits.

Composition

1. Conjugate (I).
2. Solubilizer Pluronic F127—in the amount, five-fold greater than the conjugate amount by weight.
3. Diluent—Haemodes infusion solution.
4. Dimethyl sulfoxide—in the amount of 5% of the prepared volume.

Species, line, number, age of animals.

A 100 white ° inbred mature male rats about 2 months old with a body weight of 190-210 g and 60 sexually mature male rabbits of the Soviet Chinchilla breed about 2 months old with a body weight of 2-12 kg were involved in the experiment.

The prospective study design of chronic toxicity of Conjugate (I) is presented in Table 2. The study design determined the intravenous administration of the test drugs once every 3 weeks for 3 months (a total of 4 injections) for the experiment of chronic toxicity determination. The local irritant effect of the products within intravenous administration will be studied together with the chronic toxicity study.

Each animal received the intravenous injection of the test drug or the reference drug in a volume not exceeding the acceptable volume for a single injection of 2 mL for rats and 20 mL for rabbits. The products were replaced with a Pluronic solution with DMSO in Haemodes in the control group of animals. The duration of observation for laboratory animals was 4 weeks (intermediate stage).

Apparent signs of intoxication were evaluated daily. During the study, integral indicators of animal health were recorded (see Tables 15. 16, 17).

The result of chronic toxicity study of Conjugate (I) confirmed that the product demonstrated a moderate toxicity, approximately similar for both animal species. The intoxication signs were recorded only in groups received a dose, equivalent to 1,5 of the committed effective dose. The main observed toxic effect was the decreased body weight gain in both animal species.

The analysis of results for rat excretory system demonstrated the product impact a reliable decreased urine volume, there were acidity changes.

The free therapeutic agent MMAE has demonstrated a high toxicity—only one rat animal and no rabbits survived up to the second injection, Example 7

The Finished Dosage form of Conjugate (1)
Product for the Practical use of the Invention The finished dosage form is intended for practical use of the invention and is a lyophilized pharmaceutical product that includes the Conjugate (I) in accordance with the invention and may also include diluents, vehicles, buffers and other appropriate components for sterile dosage forms.

The drug allows to obtain the drug as a solution for injections and/or conjugate infusions in accordance with the invention, which corresponds to its clinical needs within its concentration.

The structural molecular properties were investigated, when a dosage form developed, using ACDLabs, Molinspiration, Chem Axon, ALOGPS 2.2 programs, the analysis of LogS LogP, pKa parameters was performed (Table 18).

According to the data provided, the substance according to its properties is a molecule having lots of peptide bonds. There are following data for solubility evaluation: Log P=5.28+–2.3 и Log S=–5.55, which is equivalent for dilution of 6.33 mg/L in clean water. Another parameter we have is value of molecular surface polarization (PSA/TPSA). The molecule is sufficiently polar, which is indicated by the value PSA/TPSA.

The diluents, used to obtain injection dosage forms, may include ethyl alcohol, methyl alcohol, isopropyl alcohol, tert-butanol, water, dimethylsulfoxide, buffer solutions, fatty oils, vegetable oil mixtures with ethyl oleate, benzyl benzoate, aqueous-glycerol oils, ethanol-aqueous-glycerol oils.

Text-butanol and its aqueous mixtures, isopropyl alcohol and its aqueous mixtures are more preferable because the molecule has many polar groups and is a peptide at the same time.

The vehicle used in the product can be a mono-, di-, or trisaccharide. Examples of monosaccharides that may be mentioned are glucose, mannose, galactose, fructose and sorbose, examples of disaccharides that may be mentioned are sucrose, lactose, maltose and trehalose, and raffinose is an example of a trisaccharide that may be mentioned. Also, the specified vehicle may be a sorbitol, as well as any other substance with a suitable glass transition temperature.

The used product vehicle may represent water-soluble polymers, suitable for using in the pharmaceutical composition content of the invention, including but not limiting the following substances: polyvinylpyrrolidone (PVP), high molecular weight polyalkylene oxides such as polyethylene oxide and polypropylene oxide and copolymers of ethylene oxide and polypropylene oxide, polyvinyl alcohol. The vehicle is present in the product in a concentration of about 50-99%.

If the product includes buffer solutions, then they should be physiologically tolerated substances that are acceptable to establish the desired pH value. The amount of buffer substances is chosen so that after the lyophilized product reconstitution, for example, using water for injections, the resulting aqueous solution has a buffer concentration from 5 mmol/L to 20 mmol/L, preferably about 10 mmol/L. Preferred buffer solutions are citrate buffer solution or phosphate buffer solution. Acceptable phosphate buffer solutions are solutions of phosphoric acid salts of mono- and/or disodium and potassium, such as disodium hydrogen phosphate or potassium dihydrogen phosphate, as well as mixtures of sodium and potassium salts, such as, for example, disodium hydrogen phosphate and potassium dihydrogen phosphate mixtures.

If the reconstituted solution is not already isotonic due to the osmotic properties of the conjugate, then the excipients which are necessary for setting and stabilization of isotonic solution properties can be such as: preferably, physiologically tolerable salt, for example, sodium chloride or potassium chloride, or a physiologically tolerable polyol, for example, glucose or glycerin.

In addition, the drug may also include physiologically tolerable excipients, such as, for example, antioxidants, such as ascorbic acid or glutathione, preservatives, such as phenol, cresol, methyl or propyl paraben, chlorbutanol, thiomersal or benzalkonium chloride, polyethylene glycols (PEG), such as PEG 3000, 3350, 4000 or 6000, Or cyclodextrins, such as hydroxypropyl-β-cyclodextrin, sulfobutylethyl-β-cyclodextrin or γ-cyclodextrin, chilators, such as disodium edetate.

The product may include the diluent for lyophilizate according to the invention. Based on characteristics of active component and lyophilizate, the diluent may comprise ethyl alcohol, ethyl alcohol with surface-active substances such as polysorbates, polyethylene glycol, complex ester of polyoxyethylene glycol and derivatives of polyoxyethyl tine castor oil of different proportions.

Preferably, 95% ethyl alcohol with polysorbate 80 of 30-60 to 70-40 weight proportion ay be used as a diluent. These proportions were experimentally confirmed. The results of visual inspection and spectrophotometry studies of specimens at wave length of 390 nm showed that within proportions beyond the scope, the product as a lyophilizate is not soluble.

More preferably, 95% ethyl alcohol with polysorbate 80 of 43 to 57 weight proportion may be used as a diluent.

The preparation according to the invention can be obtained by preparing an aqueous product comprising Conjugate (I) as an active ingredient, as well as a vehicle and, if desired, pharmaceutical excipients such as buffer salts and preservatives, followed by lyophilization of the solution and reconstitution of lyophilizate in diluent.

The finished dosage forum is composed, but not limited to the following examples;

(see Tables 19-24)

To prepare the finished dosage form use the following stages:

Lyophilizate Preparation

Excipients and Conjugate(I) are transferred to the isolator with integrated system for preparation of solutions and lyophilizates. Weigh the following amounts of starting materials;

1) Place 750 mL of 2-methyl-2-propranolol and 250 mL of citrate buffet solution with pH 4.5 into the flask of 2000 mL for solution preparation marked with identification label; weigh 5.5 g of Conjugate(I) and 22.0 g of polyvinylpyrrolidone. Place alternately weighed amounts of Conjugate(I) and polyvinylpyrrolidone into the flask for solution preparation, containing the mixture of 2-methyl-2-propranolol and citrate buffer solution with pH 4.5. Stir using a stirrer until complete component dissolution and obtaining, of clear homogenous solution. Filter the obtained solution out of the flask through the membrane filtration system into the intermediate flask for bottling.

2) Place 750 mL of 2-methyl-2-propranolol and 250 mL of purified water into the flask of 2000 mL for solution preparation marked with identification label. Place alternately weighed amounts of Conjugate(I) and polyvinylpyrrolidone into the flask for solution preparation, containing the mixture of 2-methyl-2-propranolol and purified water. Stir using a stirrer until complete component dissolution and obtaining of clear homogenous solution. Filter the obtained solution out of the flask through the membrane filtration system into the intermediate flask for bottling.

3) Place 800 mL of isopropanol (isopropyl alcohol) and 200 mL of citrate buffer solution with pH 4.5 into the flask of 2000 mL for solution preparation marked with identification label; weigh 5.5 g of Conjugate(I) and 22.0 g of polyvinylpyrrolidone. Place alternately weighed amounts of Conjugate(I) and polyvinylpyrrolidone into the flask for solution preparation, containing the mixture of isopropanol and citrate buffer solution with pH 4.5. Stir using a stirrer until complete component dissolution and obtaining of clear homogenous solution. Filter the obtained solution out of the flask through the membrane filtration system into the intermediate flask for bottling.

4) Place 800 mL of isopropanol (isopropyl alcohol) and 200 mL of purified water into the flask of 2000 mL for solution preparation marked with identification label; weigh 5.5 g of Conjugate(I) and 22.0 g of polyvinylpyrrolidone. Place alternately weighed amounts of Conjugate(I) and polyvinylpyrrolidone into the flask for solution preparation, containing the mixture of isopropanol and purified water. Stir using a stirrer until complete component dissolution and obtaining of clear homogenous solution. Filter the obtained solution out of the flask through the membrane filtration system into the intermediate flask for bottling.

5) Place 500 mL of isopropanol (isopropyl alcohol) and 500 mL of citrate buffer solution with pH 4.5 into the flask of 2000 mL for solution preparation marked with identification label; weigh 5.5 g of Conjugate(I) and 22.0 g of polyvinylpyrrolidone. Place alternately weighed amounts of Conjugate(I) and polyvinylpyrrolidone into the flask for solution preparation, containing the mixture of isopropanol and citrate buffer solution with pH 4.5. Stir using a stirrer until complete component dissolution and obtaining of clear homogenous solution. Filter the obtained solution out of the flask through the membrane filtration system into the intermediate flask for bottling.

6) Place 500 mL of isopropanol (isopropyl alcohol) and 500 mL of purified water into the flask of 2000 mL for solution preparation marked with identification label; 5.5 g of Conjugate(I) and 22.0 g of polyvinylpyrrolidone. Place alternately weighed amounts of Conjugate (I) and polyvinylpyrrolidone into the flask for solution preparation, containing the mixture of isopropanol and purified water. Stir using a stirrer until complete component dissolution and obtaining of clear homogenous solution. Filter the obtained solution out of the flask through the membrane filtration system into the intermediate flask for bottling.

Then perform bottling into the vials within sterile conditions, where the vials were filled with solution of 1.0 mL per each vial. The vials were sealed by a rubber plug. The vials prepared n this way were placed in freeze drying.

Then perform the product freeze drying. The freezing mode is started up to the temperature of −50° C. for 7 hours. At the end of the freezing mode, the dryer automatically switches to the main drying mode, at which a pressure of 0.8 mbar is created in the chamber, and the temperature of the shelf rises to −40° C., in this mode the product was dried for 40 hours. At the end of the main drying mode, the final drying mode is switched on, the pressure gradually comes to 0.11 mbar, and the shelf is continuously heating up to 25° C. The duration of the final drying mode is up to 5 hours. At the end of the whole drying cycle, seal up the vials and close with aluminum caps.

The Diluent Preparation

Prepare the diluent for the lyophilizate reconstitution. Place 473.0 g of 95% ethyl alcohol and 627.0 g of polysorbate 80 into the flask of 2,000 mL for solution preparation marked with identification label. Stir using a stirrer until a homogenous clear solution obtained. Then perform bottling into the vials within sterile conditions, where the vials were filled with solution of 1.0 mL per each vial. Seal the vials with a rubber plug and close with aluminum caps.

The Preparation of the Finished Dosage Form as a Solution for Infusions or Injections To prepare the solution for infusions or injections perform 10-fold dilution of the lyophilizate (concentrate), reconstituted in the diluent, in the saline, for example, 0.9% of NaCl, to obtain a clear solution.

The proportions of ethanol: polysorbate 80 diluents were selected during experimental works. Different proportions of diluent in a volume of 1 mL were added to the lyophilizate and stirred for 5 minutes (the total time did not exceed 10 min). Then, to prepare the solution for infusions or injections perform 10-fold dilution of the lyophilizate, reconstituted in the diluent, in 0.9% of NaCl. The obtained solutions were evaluated visually and by spectrophotometry at the wave length of 390 nm. The measurements were performed before and after filtration through the 0.22 μm filter. Measurement results are provided in the Table 25. The results of measurements showed that the 1-5 compositions result in a clear solution before and after filtration, indicating that the diluted product is obtained, whereas 6 and 7 compositions form muddy solutions (large micelles) absorbing on the filter during the filtration.

The Stability of lyophilizate containing Conjugate (I) was investigated within fast-storage at 25° C. (1 year equivalent) and within 1 year of natural storage at temperature of minus (20±2)° C. The evaluation results showed that the lyophilizate was sustainable under all test quality parameters during the investigated shelf life. Stability data are provided in Table 26 and 27.

TABLE 1

22Rv1 prostate cancer s.c. xenografts growth inhibition within conjugate (I) after intraperitoneal triple injection after 5 days Tumor volume (mm³) and efficacy rates before treatment (0) and one day after drug administration (1-8)

| No. of tumor/values | 0 | | 1 | | 4 | | 8 | |
|---|---|---|---|---|---|---|---|---|
| | TGC | Conjugate (I), 0.3 mg/kg | TGC | Conjugate (I), 0.3 mg/kg | TGC | Conjugate (I), 0.3 mg/kg | TGC | Conjugate (I), 0.3 mg/kg |
| 1. | Tumors detected, not liable | | 176 | 18 | 411 | 72 | 686 | 94 |
| 2. | to measurement | | 250 | 40 | 555 | 81 | 896 | 96 |
| 3. | (~10-20 mm³) | | 102 | 22 | 391 | 72 | 805 | 346 |
| 4. | | | 130 | 17 | 471 | 42 | 872 | 111 |
| 5. | | | 69 | 45 | 322 | 75 | 504 | 369 |
| 6. | | | 135 | 14 | 382 | 38 | 682 | 186 |
| 7. | | | 207 | 19 | 703 | 78 | 1,136 | 463 |
| 8. | | | 322 | 30 | 867 | 173 | 2,175 | 597 |
| 9. | | | 79 | 32 | 283 | 63 | 1,059 | 570 |
| 10. | | | 111 | 31 | 406 | 108 | 982 | 314 |
| 11. | | | 321 | 51 | 947 | 115 | 1,911 | 853 |
| 12. | | | 126 | 30 | 514 | 65 | 1,148 | 177 |
| 13. | | | 180 | 17 | 717 | 74 | 1,511 | 247 |
| 14. | | | 95 | 34 | 661 | 102 | 1,325 | 349 |
| V mean | — | | 165 | 28 | 545 | 83 | 1,121 | 341 |
| Stand. dev. | — | | 83 | 11 | 205 | 34 | 475 | 220 |
| TGI % | — | | — | 83 | — | 85 | — | 70 |
| t-test | — | | | 0.000002 | | 0.0000001 | | 0.00001 |

TABLE 2

Body weight of mice at different time moments after treatment initiated, mean and its error (M ± m)

| | Days after treatment initiated | | | | |
|---|---|---|---|---|---|
| Group | 0 | 2 | 4 | 6 | 8 |
| Control | 23.9 ± 0.47 | 23.2 ± 0.27 | 24.8 ± 0.16 | 25.2 ± 0.17 | 25.7 ± 0.21 |
| Conjugate (I) (0.3 mg/kg) | 22.2 ± 0.53 | 21.2 ± 0.36 | 18.0 ± 0.48 | 19.2 ± 0.35 | 19.4 ± 0.4 |

TABLE 3

Lymphoid leukosis model 388 - Body weight of mice at different moments after treatment initiated

| | Days after treatment initiated | | |
|---|---|---|---|
| Group | 0 | 2 | 4 |
| Control | 22.3 ± 0.68 | 22.2 ± 0.5 | 23.7 ± 0.62 |
| Control (solvent) | 19.1 ± 0.48 | 18.1 ± 0.54 | 20.2 ± 0.5 |
| Conjugate (I) (0.5 mg/kg) | 19.9 ± 0.36 | 19.2 ± 0.28 | 19.2 ± 0.32 |
| Conjugate (I) (1.0 mg/kg) | 19.7 ± 0.36 | 19.7 ± 0.48 | 19.7 ± 0.42 |

TABLE 4

S.c. B16 melanoma growth inhibition within conjugate (I) after intraperitoneal triple administration after the course of 5 days Tumor volume (mm$^3$) and efficacy rates one day after treatment termination

| | 1 | | 4 | | 8 | |
|---|---|---|---|---|---|---|
| No. of tumor, values | TGC | Conjugate (I) 1.0 mg/kg | TGC | Conjugate (I) 1.0 mg/kg | TGC | Conjugate (I) 1.0 mg/kg |
| 1 | 48 | 64 | 595 | 448 | 1,470 | 855 |
| 2 | 125 | 135 | 1,386 | 768 | 3,640 | 1,030 |
| 3 | 56 | 72 | 504 | 364 | 1,134 | 855 |
| 4 | 72 | 64 | 1,020 | 476 | 2,912 | 1,045 |
| 5 | 1,020 | 48 | 2,160 | 220 | fell | 675 |
| 6 | 134 | 90 | 915 | 544 | 1,846 | 1,144 |
| 7 | 365 | 36 | 967 | 525 | 2,256 | 972 |
| 8 | 290 | 16 | 1,520 | 120 | 2,785 | 560 |
| Mean | 264 | 66 | 1,133 | 433 | 2,292 | 898 |
| Std dev. | 194 | 14 | 331 | 81 | 626 | 73 |
| TGI % | — | 75 | — | 62 | — | 61 |

TABLE 5

Concentration of Conjugate (I) in blood plasma of rabbits and relevant descriptive statistics data

| | Time after administration (hour) | | | | | | | | | | | | |
|---|---|---|---|---|---|---|---|---|---|---|---|---|---|
| Animal | 0.00 | 0.08 | 0.25 | 0.50 | 1.00 | 1.50 | 2.00 | 3.00 | 4.00 | 6.00 | 8.00 | 10.00 | 12.00 |
| | | | | | | Conentration (µg/mL) | | | | | | | |
| 1 | BLQ | 8.877 | 7.252 | 5.727 | 4.775 | 3.741 | 3.781 | 2.291 | 1.361 | 0.997 | 0.872 | 0.604 | 0.510 |
| 2 | BLQ | 9.617 | 8.986 | 6.946 | 6.323 | 5.097 | 4.699 | 3.693 | 2.878 | 1.799 | 1.703 | 1.207 | 1.042 |
| 3 | BLQ | 8.575 | 6.798 | 6.343 | 5.459 | 4.818 | 4.321 | 3.143 | 2.498 | 1.766 | 1.169 | 0.968 | 0.787 |
| 4 | BLQ | 9.582 | 10.697 | 7.254 | 5.098 | 4.849 | 3.842 | 3.600 | 2.427 | 1.307 | 1.355 | 0.859 | 0.486 |
| 5 | BLQ | 10.683 | 11.336 | 8.260 | 6.807 | 5.670 | 5.189 | 3.701 | 2.581 | 1.474 | 0.920 | 0.708 | 0.532 |
| 6 | BLQ | 15.563 | 12.954 | 10.978 | 8.502 | 6.534 | 5.922 | 4.685 | 3.365 | 1.910 | 1.221 | 0.924 | 0.584 |
| N | 0 | 6 | 6 | 6 | 6 | 6 | 6 | 6 | 6 | 6 | 6 | 6 | 6 |
| Mean value | | 10.483 | 9.671 | 7.585 | 6.161 | 5.118 | 4.626 | 3.519 | 2.518 | 1.542 | 1.207 | 0.878 | 0.657 |
| Std dev | | 2.593 | 2.416 | 1.870 | 1.376 | 0.935 | 0.827 | 0.785 | 0.663 | 0.349 | 0.305 | 0.211 | 0.218 |
| Minimum | | 8.575 | 6.798 | 5.727 | 4.775 | 3.741 | 3.781 | 2.291 | 1.361 | 0.997 | 0.872 | 0.604 | 0.486 |
| Median | | 9.600 | 9.842 | 7.100 | 5.891 | 4.973 | 4.510 | 3.647 | 2.540 | 1.620 | 1.195 | 0.892 | 0.558 |
| Maximum | | 15.563 | 12.954 | 10.978 | 8.502 | 6.534 | 5.922 | 4.685 | 3.385 | 1.910 | 1.703 | 1.207 | 1.042 |
| Range | | 6.988 | 6.156 | 5.251 | 3.727 | 2.793 | 2.141 | 2.394 | 2.004 | 0.913 | 0.831 | 0.603 | 0.556 |

TABLE 5-continued

Concentration of Conjugate (I) in blood plasma of rabbits and relevant descriptive statistics data

| Animal | Time after administration (hour) | | | | | | | | | | | | |
|---|---|---|---|---|---|---|---|---|---|---|---|---|---|
| | 0.00 | 0.08 | 0.25 | 0.50 | 1.00 | 1.50 | 2.00 | 3.00 | 4.00 | 6.00 | 8.00 | 10.00 | 12.00 |
| | Conentration (µg/mL) | | | | | | | | | | | | |
| CV % | | 24.7 | 25.0 | 24.7 | 22.3 | 18.3 | 17.9 | 22.3 | 26.3 | 22.6 | 25.2 | 24.0 | 33.1 |
| Geometr. mean | | 10.260 | 9.414 | 7.413 | 6.042 | 5.046 | 4.566 | 3.441 | 2.431 | 1.506 | 1.176 | 0.857 | 0.631 |

TABLE 6

The obtained pharmacokinetic parameters

| Animal | $C_0$ (µg/mL) | $AUC_{0-t}$ (hour · µg/ml) | $AUC_{0-\infty}$ (hour · µg/ml) | $AUC_{t-\infty}/AUC_{0-\infty}$ (%) | $K_{el}$ (1/hour) | $T_{1/2}$ (hour) | $V_d$ (mL/kg) | Cl (mL/hour/kg) | $MRT_{0-t}$ (hour) |
|---|---|---|---|---|---|---|---|---|---|
| 1 | 9.815 | 21.886 | 26.025 | 15.90 | 0.123 | 5.63 | 252.60 | 31.12 | 3.29 |
| 2 | 9.947 | 33.617 | 39.814 | 15.57 | 0.168 | 4.12 | 121.01 | 20.34 | 3.88 |
| 3 | 9.624 | 28.972 | 36.928 | 21.54 | 0.099 | 7.01 | 221.74 | 21.93 | 3.74 |
| 4 | 9.582 | 28.872 | 30.768 | 6.16 | 0.256 | 2.70 | 102.70 | 26.33 | 3.46 |
| 5 | 10.683 | 31.397 | 35.282 | 11.01 | 0.137 | 5.06 | 167.66 | 22.96 | 3.12 |
| 6 | 17.049 | 39.504 | 42.004 | 5.95 | 0.234 | 2.97 | 82.55 | 19.28 | 3.14 |
| N | 6 | 6 | 6 | 6 | 6 | 6 | 6 | 6 | 6 |
| Mean value | 11.117 | 30.708 | 35.137 | 12.690 | 0.170 | 4.581 | 158.044 | 23.662 | 3.439 |
| Std dev | 2.933 | 5.840 | 5.906 | 6.129 | 0.063 | 1.646 | 68.153 | 4.392 | 0.317 |
| Minimum | 9.58 | 21.89 | 26.02 | 5.95 | 0.099 | 2.70 | 82.55 | 19.28 | 3.12 |
| Median | 9.88 | 30.18 | 36.11 | 13.29 | 0.153 | 4.59 | 144.33 | 22.45 | 3.38 |
| Maximam | 17.05 | 39.50 | 42.00 | 21.54 | 0.256 | 7.01 | 252.60 | 31.12 | 3.88 |
| Range | 7.47 | 17.62 | 15.98 | 15.59 | 0.157 | 4.30 | 170.05 | 11.84 | 0.76 |
| CV % | 26.4 | 19.0 | 16.8 | 48.3 | 37.2 | 35.9 | 43.1 | 18.6 | 9.2 |
| Geometr. mean | 10.859 | 30.231 | 34.697 | 11.364 | 0.160 | 4.331 | 145.872 | 23.345 | 3.427 |

TABLE 7

Concentration of Conjugate (I) in blood plasma of rats and relevant descriptive statistics data

| Amnial | Time after administration (hour) | | | | | | | | | | | | |
|---|---|---|---|---|---|---|---|---|---|---|---|---|---|
| | 0.00 | 0.08 | 0.25 | 0.50 | 1.00 | 1.50 | 2.00 | 3.00 | 4.00 | 6.00 | 8.00 | 10.00 | 12.00 |
| | Concentration (µg/mL) | | | | | | | | | | | | |
| 1 | BLQ | 23.875 | 21.413 | 18.335 | 14.647 | 15.044 | 17.590 | 10.842 | 8.010 | 6.058 | 4.488 | 3.275 | 2.726 |
| 2 | BLQ | 73.356 | 42.222 | 38.542 | 33.473 | 18.741 | 14.951 | 8.544 | 5.728 | 4.247 | 3.212 | 2.180 | 1.705 |
| 3 | BLQ | 25.786 | 22.653 | 16.282 | 16.158 | 13.403 | 11.956 | 8.356 | 5.880 | 5.411 | 4.290 | 3.045 | 2.191 |
| 4 | BLQ | 13.808 | 11.389 | 12.366 | 8.552 | 7.934 | 7.995 | 6.583 | 5.853 | 4.225 | 2.620 | 1.997 | 1.527 |
| 5 | BLQ | 14.307 | 14.658 | 12.158 | 9.714 | 8.007 | 8.986 | 6.408 | 5.834 | 4.136 | 3.167 | 1.907 | 1.540 |
| 6 | BLQ | 5.351 | 7.119 | 10.304 | 8.934 | 6.334 | 7.297 | 5.360 | 3.851 | 2.938 | 2.335 | 1.809 | 1.262 |
| N | 0 | 6 | 6 | 6 | 6 | 6 | 6 | 6 | 6 | 6 | 6 | 6 | 6 |
| Mean value | | 26.081 | 19.909 | 17.998 | 15.246 | 11.578 | 11.463 | 7.682 | 5.859 | 4.503 | 3.352 | 2.369 | 1.825 |
| Std dev | | 24.326 | 12.421 | 10.489 | 9.473 | 4.903 | 4.134 | 1.970 | 1.317 | 1.098 | 0.871 | 0.629 | 0.538 |
| Minimum | | 5.351 | 7.119 | 10.304 | 8.552 | 6.334 | 7.297 | 5.360 | 3.851 | 2.938 | 2.335 | 1.809 | 1.262 |
| Median | | 19.091 | 18.036 | 14.324 | 12.481 | 10.708 | 10.471 | 7.470 | 5.844 | 4.236 | 3.190 | 2.089 | 1.623 |
| Maximum | | 73.356 | 42.222 | 38.542 | 33.473 | 18.741 | 17.590 | 10.842 | 8.010 | 6.058 | 4.488 | 3.275 | 2.726 |
| Range | | 68.005 | 35.103 | 28.238 | 24.921 | 12.407 | 10.293 | 5.482 | 4.159 | 3.120 | 2.153 | 1.466 | 1.464 |
| CV % | | 93.3 | 62.4 | 58.3 | 62.1 | 42.3 | 36.1 | 25.6 | 22.5 | 24.3 | 26.0 | 26.6 | 29.5 |
| Geometr. mean | | 19.046 | 17.024 | 16.162 | 13.435 | 10.724 | 10.869 | 7.479 | 5.732 | 4.389 | 3.259 | 2.304 | 1.765 |

TABLE 8

Obtained pharmacokinetic values

| Animal | $C_0$ (µg/mL) | $AUC_{0-t}$ (hour*µg/ml) | $AUC_{0-\infty}$ (hour*µg/ml) | $AUC_{t-\infty}/AUC_{0-\infty}$ | $K_{el}$ (1 hour) | $T_{1/2}$ (hour) | $V_d$ (mL/kg) | Cl (mL/hour/ | MRT 0-t |
|---|---|---|---|---|---|---|---|---|---|
| 1 | 25.202 | 95.993 | 115.670 | 17.01 | 0.139 | 5.00 | 93.61 | 12.97 | 3.91 |
| 2 | 96.531 | 110.564 | 121.598 | 9.07 | 0.155 | 4.49 | 79.83 | 12.34 | 2.64 |

TABLE 8-continued

| | | | Obtained pharmacokinetic values | | | | | | |
|---|---|---|---|---|---|---|---|---|---|
| Animal | $C_0$ (μg/mL) | $AUC_{0-t}$ (hour*μg/ml) | $AUC_{0-\infty}$ (hour*μg/ml) | $AUC_{t-\infty}/AUC_{0-\infty}$ | $K_{el}$ (1 hour) | $T_{1/2}$ (hour) | $V_d$ (mL/kg) | Cl (mL/hour/) | MRT 0-t |
| 3 | 27.501 | 83.377 | 96.420 | 13.53 | 0.168 | 4.13 | 92.61 | 15.56 | 3.88 |
| 4 | 15.195 | 57.819 | 69.132 | 16.37 | 0.135 | 5.14 | 160.76 | 21.70 | 4.02 |
| 5 | 14.307 | 60.334 | 69.475 | 13.16 | 0.168 | 4.11 | 128.16 | 21.59 | 3.98 |
| 6 | 5.351 | 45.653 | 54.945 | 16.91 | 0.136 | 5.10 | 201.01 | 27.30 | 4.09 |
| N | 6 | 6 | 6 | 6 | 6 | 6 | 6 | 6 | 6 |

TABLE 9

The results of the observations with single intravenous administration of the test drug into male rats

| Dose | Signs of intoxication | Necropsy | Death |
|---|---|---|---|
| Control | All animals showed a shortness of breath immediately after administration, disappearing 1-2 hours after administration | None | 0//10 |
| 2 mg/kg | No signs of intoxication | None | 0//10 |
| 3 mg/kg | 3-4 days - general health deterioration, the occurring hindlimb paresis | None | 0//10 |
| 5 mg/kg | 5 days - all animals had disheveled fur, 3 mice were closing their eyes, one had gastrointestinal bleeding. On Day 7 - general health improvement . . . | None | 0/10 |
| 5 mg/kg | 3-4 days - general health deterioration, the occurring hindlimb paresis<br>7 days - 1 death case | Necropsy on day 14: All animals had a light liver, pale kidneys (the kidney cut pattern is either absent or smeared). | 1//10 |
| 6 mg/kg | Day 4 - hindlimb paresis, cachexia, gastrointestinal bleeding (black stool), one mouse had adynamia and closed eyes. Two animals died. Day 5 - the signs mentioned above were supplied with the disheveled fur. Day 6 - in addition to current signs, 2 animals were humped, one animal died. Day 11 - one animal revealed gastrointestinal bleeding. On day 12 - improvement | None | 3//10 |
| 6 mg/kg | 3-4 days - general health deterioration, the occurring hindlimb paresis<br>Death cases at 3 (1), 6 (2) days | None | 3//10 |
| 7 mg/kg | 3-4 days - general health deterioration, the occurring hindlimb paresis, decrease movement activity | No. 2 - dark bile, coprostasis No. 4, 7 - coprostasis, hindlimb paresis | 9//10 |
| 8 mg/kg | 5 days - all animals had disheveled fur, gastrointestinal bleeding, hindlimb paresis. One animal showed diarrhea<br>Death cases in 5.5 days - 4 animals<br>6 days - the signs mentioned above remained + one animal experienced closed eyes and decreased movement activity. 7 days - 3 animals<br>11 days - 1 animal | None | 8//10 |
| 9 mg/kg | The animals demonstrated a shortness of breath right after administration, the next day - a shortness of breath, disheveled fur, watering and closing eyes. Starting from the second day, all animals were continuously developing the hindlimb paresis, the deteriorated general health. The death case on Days 3 (3), 4 (5), 5 (1), 6 (1). | Bloated intestine. Stomach had petechial mucosal hemorrhages, rectum showed wall hemorrhages, scarred mucosa, bladder had full content and wall hemorrhages | 10//10 |
| 30 mg/kg | All animals were observed with a shortness of breath right after administration, developing decreased motor activity in 3-4 minutes carrying over adynamia/spreading position. The death was observed within 12 to 28 hours after administration. While 6 of 10 animals died in 12 hours. 12 hours after administration 2 remained animals showed tremor, and 2 remained animals showed a spreading postion. | No specificities determined. Absence of pathologic changes could be related to the imminent death. | 10//10 |
| 45 mg/kg | All animals were observed with a shortness of breath right after administration, developing decreased motor activity in 3-4 minutes carrying over adynamia/spreading position. All animals died during 12 hours. | | 10//10 |

TABLE 9-continued

The results of the observations with single intravenous administration of the test drug into male rats

| Dose | Signs of intoxication | Necropsy | Death |
|---|---|---|---|
| 60 mg/kg | All animals were observed with a shortness of breath right after administration, developing decreased motor activity in 3-4 minutes carrying over adynamia/spreading position. 4 animals died after 5-7 hours, 3 of them - about 12 hours, 3 animals died in 24 hours. 12 hours after administration the remained animals developed a shortness of breath, decreased movement activity, spreading postion. | | 10//10 |

TABLE 10

Dose/effect correlation within intravenous administration of test drug to male mice
Dose-effect correlation while administration
Test drug

| Dose mg/kg | 3 | 5 | 6 | 7 |
|---|---|---|---|---|
| Fatality | 0 | 1 | 3 | 10 |
| LD50 | | 6.3 ± 0.8 mg/kg | | |

TABLE 11

Body weight dynamics of male mice in the experiment using a single administration of test drug and control animal group in % of initial body weight.

| Group | Dose mg/kg | No. of animal | Day 5 | Day 10 | Day 14 |
|---|---|---|---|---|---|
| 5 | 0 | 1 | 16.8 | 28.6 | 31.9 |
| 5 | 0 | 2 | 15.9 | 30.5 | 33.6 |
| 5 | 0 | 3 | 14.8 | 29.3 | 39.3 |
| 5 | 0 | 4 | 20.7 | 36.0 | 46.8 |
| 5 | 0 | 5 | 19.6 | 29.2 | 35.6 |
| 5 | 0 | 6 | 11.9 | 26.1 | 31.0 |
| 5 | 0 | 7 | 20.4 | 36.1 | 46.6 |
| 5 | 0 | 8 | 21.1 | 27.8 | 33.6 |
| 5 | 0 | 9 | 20.2 | 35.8 | 45.4 |
| 5 | 0 | 10 | 17.4 | 34.4 | 39.7 |
| M ± SD | | | 17.88 ± 3.0 | 31.38 ± 3.8 | 38.35 ± 6.1 |
| 12 | 3 | 1 | −6.3 | 0.0 | 36.1 |
| 12 | 3 | 2 | −19.0 | 16.8 | 30.5 |
| 12 | 3 | 3 | −15.4 | 18.8 | 32.7 |
| 12 | 3 | 4 | −22.1 | −9.1 | 13.9 |
| 12 | 3 | 5 | −11.0 | 18.6 | 34.3 |
| 12 | 3 | 6 | −11.4 | 16.3 | 35.1 |
| 12 | 3 | 7 | −13.3 | 13.8 | 25.7 |
| 12 | 3 | 8 | −13.8 | 17.9 | 35.7 |
| 12 | 3 | 9 | −5.6 | 18.9 | 35.2 |
| 12 | 3 | 10 | −13.9 | −9.9 | 11.9 |
| M ± SD | | | −13.2 ± 5.1 | 9.9 ± 11.7 | 29.1 ± 9.1 |
| 11 | 5 | 1 | −27.1 | D | D |
| 11 | 5 | 2 | −14.3 | −6.7 | 13.8 |
| 11 | 5 | 3 | −28.2 | −12.9 | 15.3 |
| 11 | 5 | 4 | −23.8 | 1.0 | 24.3 |
| 11 | 5 | 5 | −26.1 | −20.8 | 5.8 |
| 11 | 5 | 6 | −6.0 | 13.9 | 36.8 |
| 11 | 5 | 7 | −22.4 | −18.0 | 10.7 |
| 11 | 5 | 8 | −12.0 | 16.8 | 33.7 |
| 11 | 5 | 9 | −21.0 | −5.2 | 26.7 |
| 11 | 5 | 10 | −27.8 | −6.8 | 17.1 |
| M ± SD | | | −20.9 ± 7.6 | −4.3 ± 13.0 | 20.5 ± 10.5 |

*D—an animal died by the time of control measurement

TABLE 12

The results of the observations within a single intravenous administration of test drug to male rats

| Dose | Signs of intoxication | Necropsy | Death | Notes |
|---|---|---|---|---|
| Control | All animals developed a shortness of breath 1-5 minutes after administration disappearing 40-60 minutes after administration. | None | 0//10 | |
| 1 mg/kg | All animals developed a shortness of breath 1-5 minutes after administration disappearing 40-60 minutes after administration No diarrhea was observed on Day 5. | Necropsy on day 14:<br>1- NORMAL<br>2- NORMAL<br>3- light kidneys<br>4- NORMAL<br>5- NORMAL<br>6- light kidneys, blurred pattern lines<br>7- adrenals glands had hemorrhages, kidneys are unevenly stained<br>8- light kidneys<br>9- large spleen, granular kidneys<br>10- kidneys with hemorrhages | 0//10 | |
| 2 mg/kg | All animals developed a shortness of breath 1-5 minutes after administration disappearing 40-60 minutes after administration The next day after administration 4 of 10 animals experienced a loose stool, it was resolved by day 5 | Necropsy on day 14:<br>1- very light kidneys, unclear pattern, large spleen<br>2- light-brown kidneys, dark adrenal glands with hemorrhages<br>3- light-brown kidneys with hemorrhages, kidney cut pattern is clear<br>4- light-brown kidneys with hemorrhages, kidney cut pattern is clear | 0//10 | |

TABLE 12-continued

The results of the observations within a single intravenous administration of test drug to male rats

| Dose | Signs of intoxication | Necropsy | Death | Notes |
|---|---|---|---|---|
| | | 5- kidneys are lighter than a standard<br>6- kidneys are almost standard, dark and increased adrenal glands<br>7- spotted liver, light kidneys, their structure is visible<br>8- liver is lighter than a standard, light kidneys<br>9- dark maroon pancreas, increased and bloody adrenal gland (left one)<br>10- dark maroon pancreas, kidneys with hemorrhages, blurred cut pattern, the color is lighter than a standard | | |
| 3 mg/kg | All animate developed a shortness of breath 1-5 minutes after administration disappearing 40-60 minutes after administration<br>6 animals developed diarrhea on Days 2-4, three animals resolved it by day 5. The remained animals managed it by day 7. | Necropsy on day 14:<br>1- light kidneys with hemorrhages<br>2- light kidneys with hemorrhages, blurred pattern<br>3- light kidneys with hemorrhages<br>4- increased adrenal glands, light kidneys with hemorrhages<br>5- standard kidneys<br>6- kidneys with hemorrhages, clear cut pattern<br>7- light, spotted, unevenly stained kidneys<br>8- light kidneys<br>9- light kidneys, increased adrenal glands, kidneys with hemorrhages<br>10- kidneys with hemorrhages, dark and increased adrenal glands | | |
| 3 mg/kg | All animals developed a shortness of breath 1-5 minutes after administration disappearing 40-60 minutes after administration.<br>All animals experienced diarrhea on Day 5 completely resolving during a week | None | 0//10 | |
| 4 mg/kg | All animals developed a shortness of breath 1-5 minutes after administration disappearing 40-60 minutes after administration<br>All animals developed diarrhea on Days 2-4, 2 animals remained it by day 5. The remained animals managed it by day 7. | Necropsy on day 14:<br>1- kidneys with hemorrhages, unclear pattern<br>2- spotted kidneys with hemorrhages, clear pattern<br>3- increased right adrenal gland, standard kidneys<br>4- slightly increased adrenal glands, with hemorrhages, clear pattern<br>5- spotted kidneys with hemorrhages, clear pattern<br>6- standard kidney color, blurred cut pattern, unclear lines<br>7- kidney surface hemorrhages, visible pattern<br>8- light kidneys with hemorrhage foci, unclear pattern of the tine, blurred lines, severely increased adrenal glands. Large spleen<br>9- slightly increased, hyperemic adrenal glands, kidney surface hemorrhages, standard pattern<br>10- standard kidneys | 0//10 | |
| 4.5 mg/kg | Decreased mot. activity - 5-40 minutes<br>Shortness of breath - 1-60 minutes<br>on Days 1-2 all animals developed diarrhea, cachexia, porphyria, decreased mot. activity (slowly resolving during 10 days or before death time moment)<br>Death cases occurred in 2 days (1), 3 days (1), 13 days (1) | Necropsy (No. 4) - 12 Mar. 2019<br>increased and hyperemic kidneys; spotted, dark kidneys; the renal pelvis is poorly visible/of grey-red color/the lines are not visible<br>Necropsy of survived ones on Day 14;<br>Only rat No. 5 had Sight kidneys<br>Others had standard ones | 3//10 | |
| 5 mg/kg | Shortness of breath was similar to control. | There was a typical necropsy pattern; the stomach was fulled either with sawdust or water. The liver was dark, full of blood, the kidneys were swelled, adrenal glands were dark and increased. The vessels were severely increased and full of blood. | 2//10 | Closer to death, regardless of a dose there was the decreased movement activity/lethargy (approximately 24 hours before death), determined porphyrin released out of nose and eyes. Regardless of a dose, every animal developed diarrhea and anal leakage, general starvation. |

TABLE 12-continued

The results of the observations within a single intravenous administration of test drug to male rats

| Dose | Signs of intoxication | Necropsy | Death | Notes |
|---|---|---|---|---|
| 5 mg/kg | Shortness of breath was similar to control. All animals developed diarrhea/cachexia next day after administration, maintaining this condition by day 5 | (No. 1): spotted kidneys with hemorrhages, 3-fold increased adrenal glands, full stomach, yellow excrement, spleen with hemorrhages, maroon pancreas, the vessels are full with dark blood. Liver N. Kidneys had yellowish color, the pattern was unclear, the lines were blurred.<br>Necropsy of survived ones on Day 14:<br>  2 - light brown kidneys with greenish shade, blurry cut pattern, no lines, increased adrenal glands, kidneys with soft consistency, maroon pancreas, the liver is unevenly stained.<br>  3- light brown kidneys with hemorrhages, but the pattern had clear lines, was well-visible. The kidneys were a bit soft. The liver had petechial hemorrhages.<br>  6- kidneys were lighter than a standard with marshy shade, a bit soft consistency, the pattern was visible but the lines were unclear. The kidneys had hemorrhages.<br>  9, 10 - similar to 6<br>All rats had a large spleen | 3//10 | |
| 5.1 mg/kg | Decreased mot. activity - 5-40 minutes Shortness of breath - 1-60 minutes Days 1-2 - all animals had diarrhea, cachexia, decreased emotional activity, decreased mot activity (resolving continuously during 4 days or up to the death time moment, one rat didn't show a resolution (body weight was 130 at the end) Death cases occurred in 2 days (2), 4 days (1), 5 days (1) | Necropsy of survived ones on Day 14: One animal had increased adrenal glands, very light kidneys, unclear pattern. Others had standard ones | 4//10 | |
| 5.4 mg/kg | Decreased mot. activity - 5-40 minutes Shortness of breath - 1-60 minutes Days 1-2 - all animals had diarrhea, cachexia, decreased emotional activity, decreased mot. activity No standard achieved. Two animals had the hindlimb paresis Death cases occurred in 2 days (4), 2.5 days (1), 4 days (2), 5 days (1), 6 days (1), 9 days (1) | It was managed to perform the necropsy:<br>  1 - (Mar. 12, 2019): kidneys with hemorrhages - non-visible pattern, severely increased adrenal glands (hyperemic), the stomach was full of sawdust.<br>  2 - (Mar. 12, 2019) kidneys with hemorrhages, severely increased adrenal glands<br>  5 - (Mar. 12, 2019) increased hyperemic adrenal glands. There was no kidney pattern while cut. All structures were stained with dark-red color, the stomach was full of sawdust | 10//10 | |
| 6 mg/kg | Shortness of breath was similar to control. on Day 2 - all animals showed diarrhea On Day 3 - diarrhea, half of animals showed decreased mot. activity, there were humped ones | There was a typical necropsy pattern: the stomach was fulled either with sawdust or water. The liver was dark, full of blood, the kidneys were swelled, adrenal glands were dark and increased. The vessels were severely Increased and full of blood. | 10//10 | Closer to death, regardless of a dose there was the decreased movement activity/lethargy (approximately 24 hours before death), determined porphyrin released out of nose and eyes. Regardless of a dose, every animal developed diarrhea and anal leakage, general starvation. |
| 8 mg/kg | Shortness of breath was similar to control. The death cases occurred 3-4 days after administration. There were diarrhea, general starvation, adynamia observed before death. | | 10//10 | |
| 15 mg/kg | Shortness of breath was similar to control. Death cases occurred in 1 day (2), 2 days (4), 2.5 days (2), 3 days (2). The signs of Intoxication were developed gradually: after 12 hours - decreased movement activity, the remained animals showed adynamia and flattened position on Days 1-3. | | 10//10 | |
| 23 mg/kg | Shortness of breath was similar to control. Death cases occurred in 10-12 hours (2), 24 hours (4), 27 h (1), 40 h (1), 48 h (1), 72 h (1). The signs of intoxication were developed gradually: after 10-12 hours - all animals showed a shortness of breath, decreased movement activity, 2 animals had tremor, the remained animals demonstrated a flattened position at 24-48 hours, | | 10//10 | |
| 30 mg/kg | Shortness of breath was similar to control Death cases occurred after 20-24 hours - 7 animals, 40 hours - 1 animal, 45 hours - 1 animal. The signs of intoxication were developed gradually: after 12 hours all survived animals | | 10//10 | |

TABLE 12-continued

The results of the observations within a single intravenous administration of test drug to male rats

| Dose | Signs of intoxication | Necropsy | Death | Notes |
|---|---|---|---|---|
| | showed decreased movement activity, a shortness of breath, diarrhea marks observed in the cage, two animals had tremor. The remained rats had a flattened position and adynamia by 24-48 h. | | | |

TABLE 13

Dose/effect correlation within intravenous administration of test drug for male mice
Dose/effect correlation while administration

| | Test drug | | | | |
|---|---|---|---|---|---|
| Dose mg/kg | 4 | 4.5 | 5 | 5.1 | 5.4 |
| Fatality | 0 | 3 | 5 | 4 | 10 |
| LD50 | | 4.9 ± 0.3 mg/kg | | | |

TABLE 14

Body weight dynamics of male mice in the experiment using a single administration of test drugand control animal group in % of initial body weight.

| Group | Dose mg/kg | No. of animal | Day 5 | Day 10 | Day 14 |
|---|---|---|---|---|---|
| 6 | 0 | 1 | 10.4 | 22.9 | 28.1 |
| 6 | 0 | 2 | 12.7 | 25.4 | 32.8 |
| 6 | 0 | 3 | 10.6 | 31.2 | 39.7 |
| 6 | 0 | 4 | 13.6 | 31.5 | 41.8 |
| 6 | 0 | 5 | 16.8 | 38.4 | 53.2 |
| 6 | 0 | 6 | 10.8 | 17.8 | 18.9 |
| 6 | 0 | 7 | 4.7 | 17.1 | 24.4 |
| 6 | 0 | 8 | 8.1 | 22.2 | 24.3 |
| 6 | 0 | 9 | 10.4 | 26.9 | 37.3 |
| 6 | 0 | 10 | 7.8 | 21.2 | 31.6 |
| M ± SD | | | 10.59 ± 3.3 | 25.46 ± 6.7 | 33.21 ± 10.1 |
| 11 | 3 | 1 | -1.5 | 17.3 | 20.8 |
| 11 | 3 | 2 | -11.2 | 5.9 | 10.1 |
| 11 | 3 | 3 | -5.1 | 16.4 | 20.0 |
| 11 | 3 | 4 | 10.8 | 25.1 | 29.1 |
| 11 | 3 | 5 | -9.4 | 11.4 | 16.8 |
| 11 | 3 | 6 | 5.5 | 20.1 | 27.1 |
| 11 | 3 | 7 | 1.4 | 19.7 | 26.4 |
| 11 | 3 | 8 | -2.4 | 17.1 | 23.8 |
| 11 | 3 | 9 | 2.0 | 13.2 | 24.9 |
| 11 | 3 | 10 | 7.6 | 26.1 | 29.4 |
| M ± SD | | | -0.2 ± 7.1 | 17.2 ± 6.1 | 22.8 ± 6.0 |
| 12 | 4 | 1 | 6.1 | 25.5 | 35.2 |
| 12 | 4 | 2 | -15.2 | 2.5 | 11.7 |
| 12 | 4 | 3 | -5.9 | 16.3 | 24.6 |
| 12 | 4 | 4 | 0.0 | 22.2 | 31.7 |
| 12 | 4 | 5 | -3.0 | 19.1 | 28.1 |
| 12 | 4 | 6 | -4.1 | 16.3 | 28.1 |
| 12 | 4 | 7 | -13.7 | 5.9 | 18.0 |
| 12 | 4 | 8 | -17.1 | -10.5 | 1.0 |
| 12 | 4 | 9 | -9.2 | 14.5 | 21.7 |
| 12 | 4 | 10 | -14.4 | -1.9 | 1.0 |
| M ± SD | | | -7.7 ± 7.6 | 11.0 ± 11.5 | 20.1 ± 12.1 |

TABLE 15

Study design of chronic toxicity of test drug

| Group No. | Route of administration | Dose (T) | Dose (µg/kg) | Q-ty |
|---|---|---|---|---|
| | Male Outbred Rats | | | |
| | Control (Pluronic Solution in Haemodes) | | | |
| 1 | Intravenously, 1 time in 3 weeks | Control | — | 10 |
| | Test drug | | | |
| 2 | Intravenously, 1 time in 3 weeks | 1 | 150 | 10 |
| 3 | Intravenously, 1 time in 3 weeks | 1.25 | 188 | 10 |
| 4 | Intravenously, 1 time in 3 weeks | 1.5 | 225 | 10 |
| | Reference drug - monomethyl auristatin E substance | | | |
| 5 | Intravenously, 1 time in 3 weeks | 1 | 10 | 10 |
| | Soviet Chinchilla male rabbits | | | |
| | Control (Pluronic Solution in Haemodes) | | | |
| 6 | Intravenously, 1 time in 3 weeks | Control | — | 6 |
| | Test drug | | | |
| 7 | Intravenously, 1 time in 3 weeks | 1 | 81 | 6 |
| 8 | Intravenously, 1 time in 3 weeks | 1.25 | 102 | 6 |
| 9 | Intravenously, 1 time in 3 weeks | 1.5 | 122 | 6 |
| | Reference drug - monomethyl auristatin E substance | | | |
| 10 | Intravenously, 1 time in 3 weeks | 1 | 5.4 | 6 |

TABLE 16

Results of observations of male rats

| Group Number/Dose | Signs of intoxication | Necropsy | Death | Notes |
|---|---|---|---|---|
| 1 (Control) | No signs of intoxication | None | 0//10 | None |
| 2 (test drug 150 µg/kg) | No signs of intoxication | None | 0//10 | None |
| 3 (test drug 188 µg/kg) | No signs of intoxication | None | 0//10 | None |
| 4 (test drug 225 µg/kg) | 2-3 days after the first administration of the test drug, all animals in the | None | 0//10 | None |

TABLE 16-continued

Results of observations of male rats

| Group Number/Dose | Signs of intoxication | Necropsy | Death | Notes |
|---|---|---|---|---|
| 5 (MMAE 10 µg/kg) | group developed diarrhea finishing on days 6-7. 2-3 days after the second administration of the test drug, the animals showed diarrhea. 30 Apr. 2019: animals were observed with impaired movement coordination, shortness of breath, diarrhea, loss of body weigh of 15-20 g 1 May 2019: rat No. 1 - flattened position, tremor, the hind limb paresis; rat No. 2 - flattened position, the hindlimb paresis; rats No. 3-5 - impaired coordination of movement, decreased motor activity, the hind limb paresis; rat No. 6 - flattened position, tremor, the hind limb paresis; rat No. 9 - impaired coordination of movement, decreased motor activity 2 May 2019: rat No. 3 - shortness of breath, tremor, shaky gait, diarrhea with yellow intestinal discharge 20 May 2019: rat No. 3 - shortness of breath, flattened position, the hindlimb paresis, porphyrin secretion (eyes) | No. 1, 5, 6: the stomach and intestine were severely inflated; adrenal glands were 2-fold increase; blood in the kidneys, pink renal pelvis. No. 3: the stomach was full of greenish-yellow liquid contents; mucous membrane had hemorrhages and ulcers; the kidneys were pale, the renal pelvis was pale; the adrenal glands were enlarged, hyperemic; the pancreas was dark; the liver was granular, palish. | 10//10 | No. 1, 2, 4, 5, 6 - death on 1 May 2019 (day 3) No. 7, 8, 10 - death at night from 30 Apr. 2019 to 1 May 2019 (1.5 days) No. 9 - death at night from 1 May 2019 to 2 May 2019 (2.5 days) No. 3 - death on 20 May 2019 (the next day after the second administration) |

TABLE 17

Results of observations of male rabbits.

| Group Number/Dose | Signs of intoxication | Necropsy | Death | Notes |
|---|---|---|---|---|
| 6 (Control) | No signs of intoxication | None | 0//6 | None |
| 7 (test drug 81 µg/kg) | No signs of intoxication | None | 0//6 | None |
| 8 (test drug 102 µg/kg) | No signs of intoxication | None | 0//6 | None |
| 9 (test drug 122 µg/kg) | After administration of the test drug, the intake of food and water was decreased. | None | 1//6 | No. 2 - death at night from May 25, 2019 to May 26, 2019 (6.5 days after the second administration) |
| 10 (MMAE 5.4 µg/kg) | After administration of the reference drug, the intake of feed and water was decreased. About a day after administration and before death, superficial respiration and adynamia were observed. | No. 4: the bladder was full; the liver was pale, granular, flabby; pale spleen with a grayish tint; thymus had hemorrhages; kidney pattern was smoothed, pale; half-empty stomach with yellow-green contents | 6//6 | Rabbits No. 1, 2, 3, 5 - death cases occurred on Day 3 (1 May 2019) Rabbit No. 4 - death case occurred on Day 4 (2 May 2019) |

TABLE 18

Physical and chemical properties of conjugate (I)

| Substance | Molecule | HD | HA | PSA/TPSA | Molecular volume | pKa (Acid) | pKa (Alkaline) | Log P | Log S |
|---|---|---|---|---|---|---|---|---|---|
| Conjugate (I) | $C_{114}H_{165}ClN_{20}O_{26}$ | 18 | 27 | 650 $Å^2$ | 2,113.27 $Å^3$ | 3.9 | 0.37 | 5.28 | −9.53 |

TABLE 19

| Composition for lyophilizate preparation | The amount for 1 dosage |
|---|---|
| Conjugate (I) | 5.00 mg |
| Polyvinylpyrrolidone | 20.0 mg |
| Tert-butanol mixture:citrate buffer pH 4.5 (75:25) | Up to 1.0 ml |
| Diluent for lyophilizate | |
| Ethyl alcohol 95% | 0.430 g |
| Polysorbate 80 | 0570 g |

TABLE 20

| Composition for lyophilizate preparation | The amount for 1 dosage |
|---|---|
| Conjugate (I) | 5.00 mg |
| Polyvinylpyrrolidone | 20.0 mg |
| Tert-butanol mixture:water (75:25) | Up to 1.0 ml |
| Diluent for lyophilizate | |
| Ethyl alcohol 95% | 0.430 g |
| Polysorbate 80 | 0.570 g |

TABLE 21

| Composition for lyophilizate preparation | The amount for 1 dosage |
|---|---|
| Conjugate (I) | 5.00 mg |
| Polyvinylpyrrolidone | 20.0 mg |
| Isopropanol mixture:citrate buffer pH 4.5 (80:20) | Up to 1.0 ml |
| Diluent for lyophilizate | |
| Ethyl alcohol 95% | 0.430 g |
| polysorbate 80 | 0.570 g |

TABLE 22

| Composition for lyophilizate preparation | The amount for 1 dosage |
|---|---|
| Conjugate (I) | 5.00 mg |
| Polyvinylpyrrolidone | 20.0 mg |
| isopropanol mixture:water (80:20) | Up to 1.0 ml |
| Diluent for lyophilizate | |
| Ethyl alcohol 95% | 0.430 g |
| Polysorbate 80 | 0.570 g |

TABLE 23

| Composition for lyophilizate preparation | The amount for 1 dosage |
|---|---|
| Conjugate (I) | 5.00 mg |
| Polyvinylpyrrolidone | 20.0 mg |
| isopropanol mixture:citrate buffer pH 4.5 (50:50) | Up to 1.0 ml |

TABLE 23-continued

| | The amount for 1 dosage |
|---|---|
| Diluent for lyophilizate | |
| Ethyl alcohol 95% | 0.430 g |
| Polysorbate 80 | 0.570 g |

TABLE 24

| Composition for lyophilizate preparation | The amount for 1 dosage |
|---|---|
| Conjugate (I) | 5.00 mg |
| Polyvinylpyrrolidone | 20.0 mg |
| Isopropanol mixture:water (50:50) | Up to 1.0 ml |
| Diluent for lyophilizate | |
| Ethyl alcohol 95% | 0.430 g |
| Polysorbate 80 | 0.570 g |

TABLE 25

| | Ratio ethanol/polysorbate 80 | Absorption before filtration | Absorption after filtration |
|---|---|---|---|
| 1 | 57/43 | 0.055 | 0.050 |
| 2 | 52/48 | 0.058 | 0.052 |
| 3 | 45/55 | 0.053 | 0.047 |
| 5 | 32/68 | 0.057 | 0.049 |
| 6 | 19/81 | 0.199 | 0.049 |
| 7 | 9/91 | 0.294 | 0.053 |

TABLE 26

Stability study of lyophilizate containing Conjugate(I) within accelerated storage at 25° C.

| Quality parameter | 0 | 3 Months | 12 Months |
|---|---|---|---|
| DESCRIPTION - Lyophilized mass or powder from white to yellowish white color. Reconstituted lyophilizate is a clear solution from clear to light green color. | | Compiles | |
| IDENTIFICATION | | Compiles | |
| CLARITY | | Compiles | |
| pH- solution pH value should be within 4.5 to 6.5 | 5.86 | 5.52 | 5.60 |
| WATER - NMT 5.0% | 1.26 | 1.45 | 1.83 |
| ASSAY | 95% | 94% | 93% |
| RELATED SUBSTANCES | 5% | 6% | 7% |

TABLE 27

Stability study of lyophilizate containing PSMA-MMAE within a natural storage at minus (20 ± 2)° C.

| Quality parameter | 0 | 3 Months | 12 Months |
|---|---|---|---|
| DESCRIPTION - Lyophilized mass or powder from white to yellowish white color. Reconstituted lyophilizate is a clear solution from clear to light green color. | | Compiles | |
| IDENTIFICATION | | Compiles | |
| CLARITY | | Compiles | |
| pH- solution pH value should be within 4.5 to 6.5 | 4.35 | 4.31 | 4.71 |

TABLE 27-continued

Stability study of lyophilizate containing PSMA-MMAE within a natural storage at minus (20 ± 2)° C.

| Quality parameter | 0 | 3 Months | 12 Months |
|---|---|---|---|
| WATER - NMT 5.0% | 0.66 | 0.73 | 1.20 |
| ASSAY | 95% | 95% | 94% |
| RELATED SUBSTANCES | 5% | 5% | 6% |

The invention claimed is:

1. A compound represented by the following formula (I) or a salt thereof:

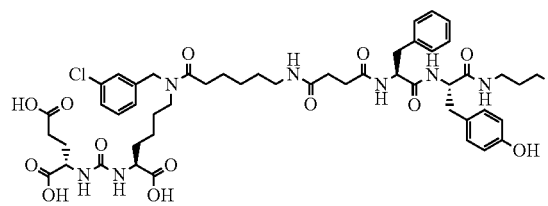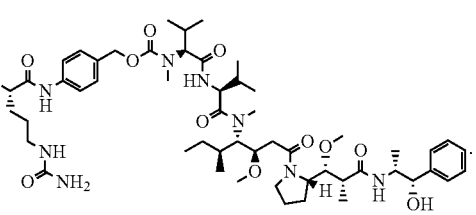

2. The compound of claim 1, wherein the compound is represented by the formula (I).

3. The compound of claim 1, wherein the compound is a salt of the compound represented by the formula (I).

4. A composition comprising the compound of claim 1 and a pharmaceutically acceptable carrier, diluent, or excipient.

5. The composition of claim 4, wherein the pharmaceutically acceptable carrier diluent or excipient comprises polyvinylpyrrolidone.

6. The composition of claim 4, wherein the pharmaceutically acceptable carrier diluent or excipient comprises isopropyl alcohol, tert-butyl alcohol or a mixture thereof and water or a citrate buffer solution.

7. The composition of claim 4, wherein the composition is in a lyophilized form, and a unit dosage of the composition comprises an amount sufficient to inhibit the growth of a tumor expressing PMSA.

8. The composition of claim 7, wherein the composition is a composition that has been reconstituted with a pharmaceutically acceptable diluent or buffer.

9. The composition of claim 7, wherein the composition is a composition that has been reconstituted with a diluent comprising 95% ethyl alcohol and polysorbate 80 at a weight ratio of 30-60 wt %:70-40 wt %, respectively.

10. The composition of claim 9, wherein the composition is in a form suitable for injection or infusion into a subject have a tumor expressing PMSA.

11. The composition of claim 10, wherein the composition is a composition that has been reconstituted with a diluent comprising 95% ethyl alcohol and polysorbate 80 at a weight ratio of 30-60 wt %:70-40 wt %, respectively.

12. The composition of claim 11, wherein the composition is the reconstituted composition diluted at least 10-fold in a physiologically acceptable solution or in normal saline.

13. A method for treating a subject having tumor expressing PMSA, the method comprising administering an effective amount of the compound of claim 1 to a subject in need thereof.

14. The method of claim 13, wherein the tumor is a prostate tumor.

15. The method of claim 13, wherein the tumor is a lung tumor, renal cell tumor, glioblastoma, pancreatic tumor, bladder tumor, sarcoma, melanoma, breast tumor, colon tumor, germ cell tumor, pheochromocytoma, esophageal tumor, or gastric tumor.

16. The method of claim 13, wherein the compound is injected or infused into the subject.

17. The method of claim 13, further comprising administering at least one different chemotherapeutic agent to the subject.

18. The method of claim 13, wherein the compound has been lyophilized and reconstituted into a composition comprising a diluent comprising 95% ethyl alcohol and polysorbate 80 at a weight ratio of 30-60 wt %:70-40 wt %, respectively.

19. The method of claim 17, further comprising diluting the composition at least 10-fold in a physiologically acceptable solution or in normal saline.

20. A method for making the compound of claim 1 comprising:

synthesizing a tritret-butyl derivative of a PSMA-binding ligand of the following formula (III):

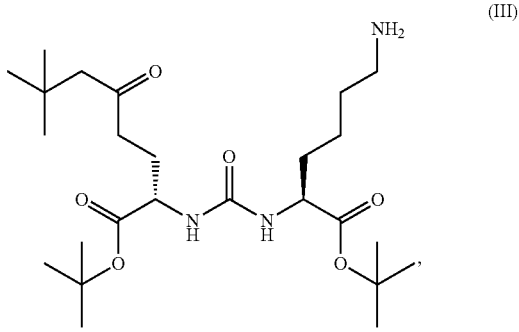 [SMILES: CC(C)(C)CC(=O)CC[C@H](NC(=O)N[C@@H](CCCCN)C(=O)OC(C)(C)C)C(=O)OC(C)(C)C]

followed by alkylation of the obtained 3-tert-butyl derivative of the PSMA-binding ligand to obtain a compound represented by the following formula (IV):

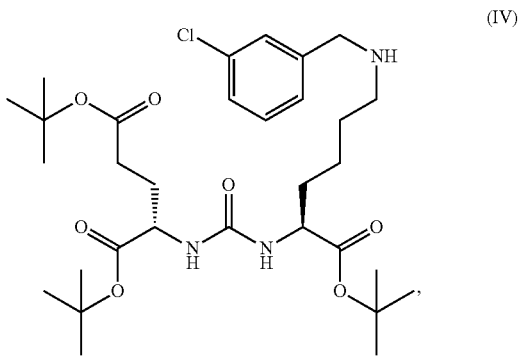 [SMILES: CC(C)(C)OC(=O)CC[C@H](NC(=O)N[C@@H](CCCCNCc1cccc(Cl)c1)C(=O)OC(C)(C)C)C(=O)OC(C)(C)C]

preparing a compound comprising an alkylated 3-tert-butyl derivative of the PSMA ligand and a linker fragment representing an alkyl fragment comprising 5 carbon atoms of the following formula (V):

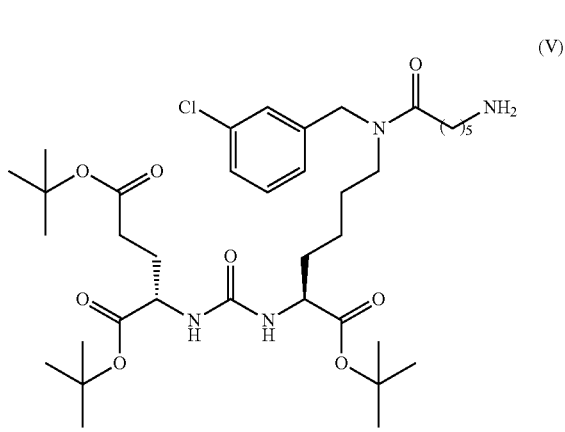

(V)

which is modified with succinic anhydride, thereby obtaining an acylated derivative, and then obtaining at least one dipeptide of aromatic amino acid derivatives, wherein the at least one dipeptide is L-phenylalanyl-L-tyrosine of the following formula (VI), to bind to a modified linker fragment,

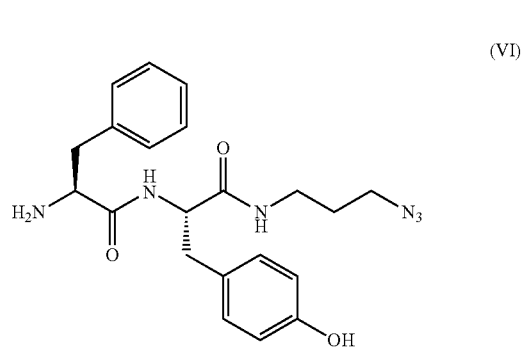 [SMILES: [N-]=[N+]=NCCCNC(=O)[C@H](Cc1ccc(O)cc1)NC(=O)[C@@H](N)Cc1ccccc1]

(VI)

reacting 3-tert-butyl derivative of the conjugate of the radical PSMA-binding ligand and a modified hydrophobic peptide linker, comprising a fragment of 6-aminohexanoic acid, a fragment of L-phenylalanine, and a fragment of L-tyrosine of the formula (VII):

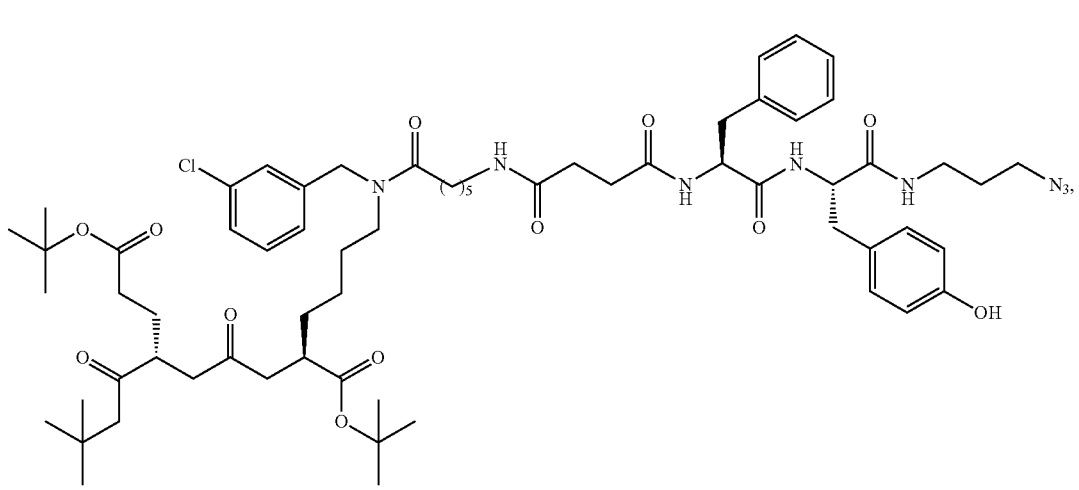

(VII)

and subsequently removing the tert-butyl protective groups of the compound of the formula (VII) to obtain a covalently bonded PSMA-binding ligand and a modified hydrophobic peptide linker to obtain a compound represented by the following formula (II):

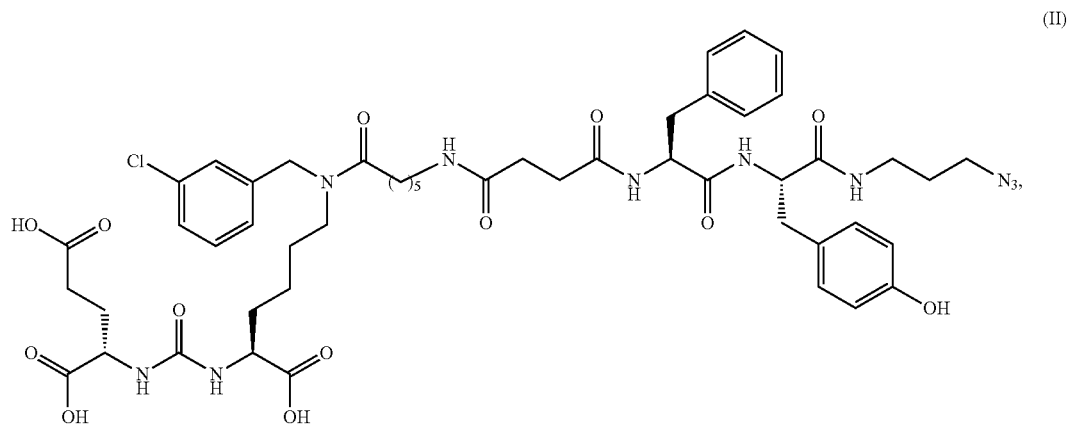

(II)

obtaining a modified monomethyl auristatin E (MMAE) compound (X), 5-hexinamido-Val-Cit-PAB-MMAE, through proteolytically splitting a dipeptide linker based on valine-citrulline containing p-aminobenzyl alcohol (Val-Cit-PAB), wherein an acylation reaction of a peptide Val-Cit-PAB derivative using 5-hexenoic acid is carried out at a first stage:

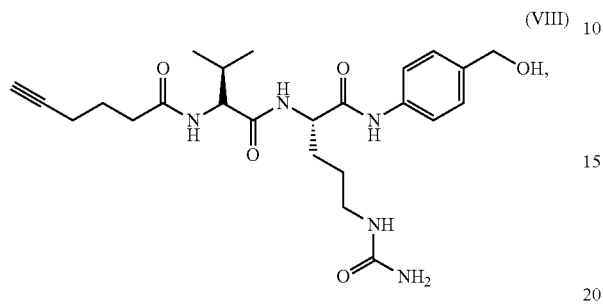
(VIII)

modifying a hydroxyl group of p-aminobenzyl fragment using bis-(4-nitrophenyl) carbonate:

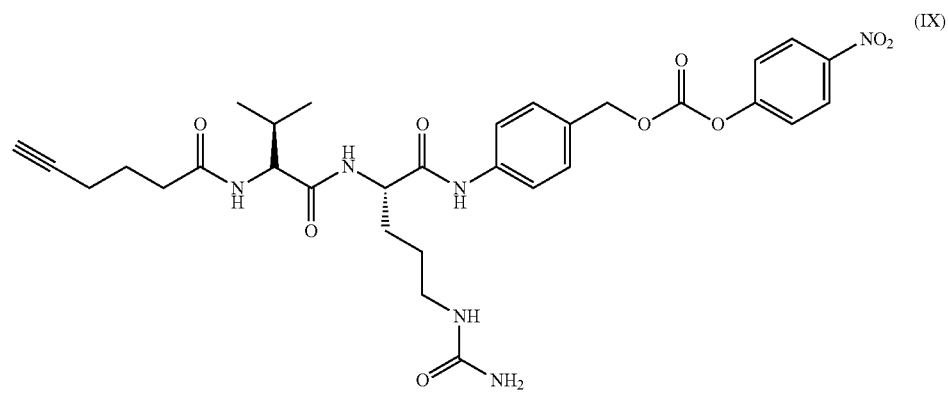
(IX)

followed by interaction of the obtained compound of the formula (IX) between monomethyl auristatin E:

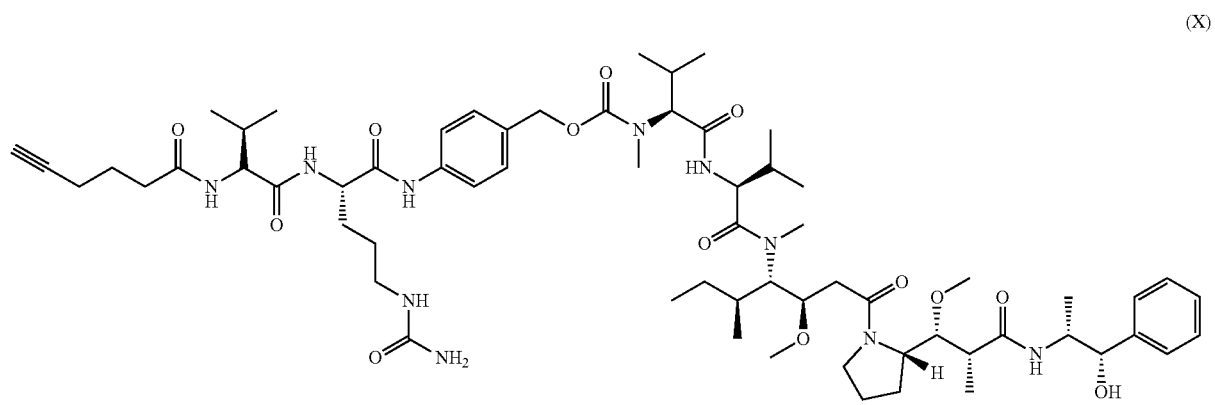
(X)

and subsequently, reacting a copper (I) catalyzed azide-alkyne cycloaddition of the compound of the formula (II) with a modified monomethyl auristatin E derivative comprising a terminal triple bond, thereby obtaining the compound represented by the formula (I).

* * * * *